US010070386B2

(12) United States Patent
Dinh et al.

(10) Patent No.: US 10,070,386 B2
(45) Date of Patent: Sep. 4, 2018

(54) DEVICE FOR WIRELESS NETWORK AND COMPUTER READABLE RECORDING MEDIUM INCLUDING COMMUNICATION METHOD THEREOF

(71) Applicant: Samsung Electronics Co., Ltd., Suwon-si, Gyeonggi-do (KR)

(72) Inventors: Nga Thi Thuy Dinh, Suwon-si (KR); Sangsoon Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 15/047,155

(22) Filed: Feb. 18, 2016

(65) Prior Publication Data

US 2017/0094602 A1 Mar. 30, 2017

(30) Foreign Application Priority Data

Sep. 24, 2015 (KR) ........................ 10-2015-0135630

(51) Int. Cl.
*H04W 52/02* (2009.01)
*H04W 72/12* (2009.01)
*H04W 84/18* (2009.01)

(52) U.S. Cl.
CPC ... *H04W 52/0229* (2013.01); *H04W 52/0219* (2013.01); *H04W 72/1247* (2013.01); *H04W 72/1289* (2013.01); *H04W 84/18* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/166* (2018.01)

(58) Field of Classification Search
CPC ......... H04W 52/0229; H04W 52/0219; H04W 72/1247; H04W 72/1289
USPC ................................ 370/331, 336, 345, 349
See application file for complete search history.

(56) References Cited

U.S. PATENT DOCUMENTS

| 7,158,814 | B2* | 1/2007 | Ozluturk | ................ | H04B 7/026 455/445 |
| 8,340,053 | B2* | 12/2012 | Kim | ...................... | H04W 74/04 370/336 |
| 2005/0174964 | A1 | 8/2005 | Orlik et al. | | |
| 2009/0168744 | A1* | 7/2009 | Park | .................... | H04W 74/006 370/349 |

(Continued)

*Primary Examiner* — Afsar M Qureshi
(74) *Attorney, Agent, or Firm* — Jefferson IP Law, LLP

(57) ABSTRACT

An upper node and a lower node which communicate with each other in a wireless network, and a computer readable recording medium including a program for executing a communication method thereof, are provided. The upper node determines priorities of the plurality of lower nodes and transmits a beacon message including information on the priorities determined by the upper node to the plurality of lower nodes, and the plurality of lower nodes determine priorities based on the beacon message received from the upper node. The upper node transmits first data to the plurality of lower nodes in a first period of an active period in an indirect data transmission method, and the plurality of lower nodes transmit second data to the upper node based on the determined priorities in a second period of the active period, in which the lower nodes communicate with the upper node, in a direct data transmission method. Accordingly, waste of battery power in the lower node can be prevented.

19 Claims, 28 Drawing Sheets

(56) References Cited

U.S. PATENT DOCUMENTS

| | | |
|---|---|---|
| 2012/0250664 A1 | 10/2012 | Li |
| 2012/0320881 A1 | 12/2012 | Hong et al. |
| 2013/0039350 A1 | 2/2013 | Bhatia et al. |
| 2013/0329719 A1* | 12/2013 | Chung ................ H04W 76/046 370/345 |
| 2015/0092530 A1* | 4/2015 | Kelsey ................ H04W 40/244 370/216 |

* cited by examiner

FIG. 9

| Bits:0-2 | 3 | 4 | 5 | 6 | 7-9 | 10-11 | 12-13 | 14-15 |
|---|---|---|---|---|---|---|---|---|
| Frame Type | Security Enabled | Frame Pending | AcK. Req. | Intra PAN | Reserved | Destination add. mode | Reserved | Source. add. mode |

901

DEVICE FOR WIRELESS NETWORK AND COMPUTER READABLE RECORDING MEDIUM INCLUDING COMMUNICATION METHOD THEREOF

CROSS-REFERENCE TO RELATED APPLICATION(S)

This application claims the benefit under 35 U.S.C. § 119(a) of a Korean patent application filed on Sep. 24, 2015 in the Korean Intellectual Property Office and assigned Serial number 10-2015-0135630, the entire disclosure of which is hereby incorporated by reference.

TECHNICAL FIELD

The present disclosure relates to a device for a wireless network and a computer readable recording medium including a communication method thereof. More particularly, the present disclosure relates to a device for a wireless network, which establishes a communication period between an upper node and a lower node in a network system formed of the upper node and the lower node, and a computer readable recording medium including a communication method thereof.

BACKGROUND

In recent years, wireless networks are getting much attention as one of core support technologies in the fields of Internet of things (IoT) establishment, home automation, industrial automation, etc. IoT refers to a communication technology which connects various devices to one another via a network and has the devices share information with one another or control one another. For example, the IoT-based technology connects home appliances to one another via the wireless Internet in a smart home environment, and allows the appliances to exchange information with one another and organically respond to one another. With the development of the recent IoT technology, many devices connected with one another via a network can analyze collected information and estimate and utilize information of other things connected on the network. Therefore, the IoT devices connected with one another in a wireless network require a technology of minimizing power consumption and extending a battery life to the maximum.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device which, in an active period in which an upper node and a lower node exchange data with each other on a wireless network, provides low power scheduling optimized to the lower node according to a priority of the lower node determined by the upper node, and provides a quality of service (QoS) to a lower node having a high priority, and a computer readable recording medium including a communication method thereof.

In accordance with an aspect of the present disclosure, an upper node which communicates with a plurality of lower nodes in a wireless network is provided. The upper node includes a communicator configured to communicate with the plurality of lower nodes using a beacon message, and a processor configured to control the communicator to transmit first data to the plurality of lower nodes in a first period of an active period, in which the upper node communicates with the plurality of lower nodes using the beacon message, in an indirect data transmission method, and control the communicator to receive second data from the plurality of lower nodes according priorities of the plurality of lower nodes in a second period of the active period in a direct data transmission method.

In accordance with another aspect of the present disclosure, a lower node which communicates with an upper node in a wireless network is provided. The lower node includes a communicator configured to receive a beacon message from the upper node and communicate with the upper node, and a processor configured to control the communicator to receive first data from the upper node in a first period of an active period, in which the lower node receives the beacon message and communicates with the upper node, in an indirect data transmission method, and control the communicator to transmit second data to the upper node according to a priority of the lower node in a second period of the active period in a direct data transmission method.

In accordance with another aspect of the present disclosure, a computer readable recording medium including a program for executing a communication method in which an upper node and a plurality of lower nodes communicate in a wireless network is provided. The communication method includes determining, by the upper node, priorities of the plurality of lower nodes, transmitting a beacon message including information on the priorities determined by the upper node to the plurality of lower nodes, determining, by the plurality of lower nodes, priorities based on the beacon message received from the upper node, transmitting, by the upper node, first data to the plurality of lower nodes in a first period of an active period in an indirect data transmission method, and transmitting, by the plurality of lower nodes, second data to the upper node based on the determined priorities in a second period of the active period, in which the lower nodes communicate with the upper node, in a direct data transmission method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a view showing a structure of a beacon message according to an embodiment of the present disclosure;

Throughout the drawings, like reference numerals will be understood to refer to like parts, components, and structures.

DETAILED DESCRIPTION

Figure 1A:
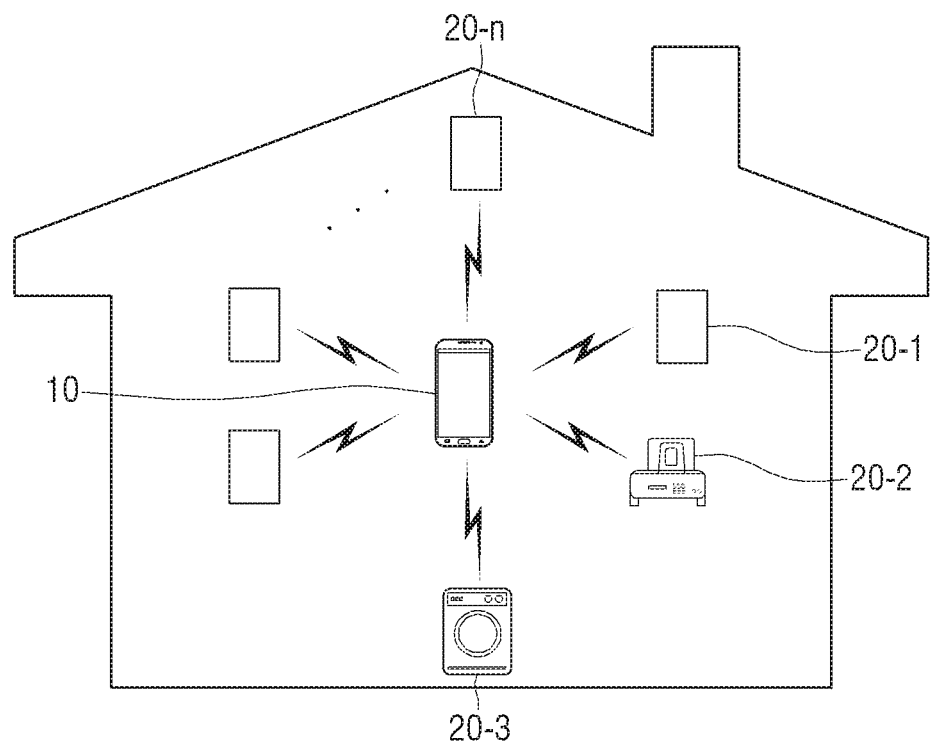
FIGS. 1A and 1B are views showing examples of a normal wireless network topology for providing an Internet of things (IoT) service according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

In addition, the term "comprise" or "include" used in various embodiments of the present disclosure should not be interpreted as necessarily including all of the elements or operations described in the specification, and should be interpreted as not including some of the elements or some of the operations or as further including additional elements or operations.

The term "unit" used in relation to the elements described in the specification may be used only for easy preparation of the specification, or interchangeably used with other terms, and does not have its own distinct meaning or role.

The terms such as "first" and "second" used in various embodiments may be used to explain various elements, and does not limit the corresponding elements. These terms may be used for the purpose of distinguishing one element from another element. For example, a first element may be named a second element without departing from the scope of right of various embodiments of the present disclosure, and similarly, a second element may be named a first element.

Various embodiments of the present disclosure will be described herein below with reference to the accompanying drawings. In the explanation of the drawings, the same reference numerals are used for the same or similar elements regardless of signs in the drawings, and a redundant explanation regarding these will be omitted.

Hereinafter, various embodiments of the present disclosure will be explained in detail with reference to the accompanying drawings.

Figure 1B:
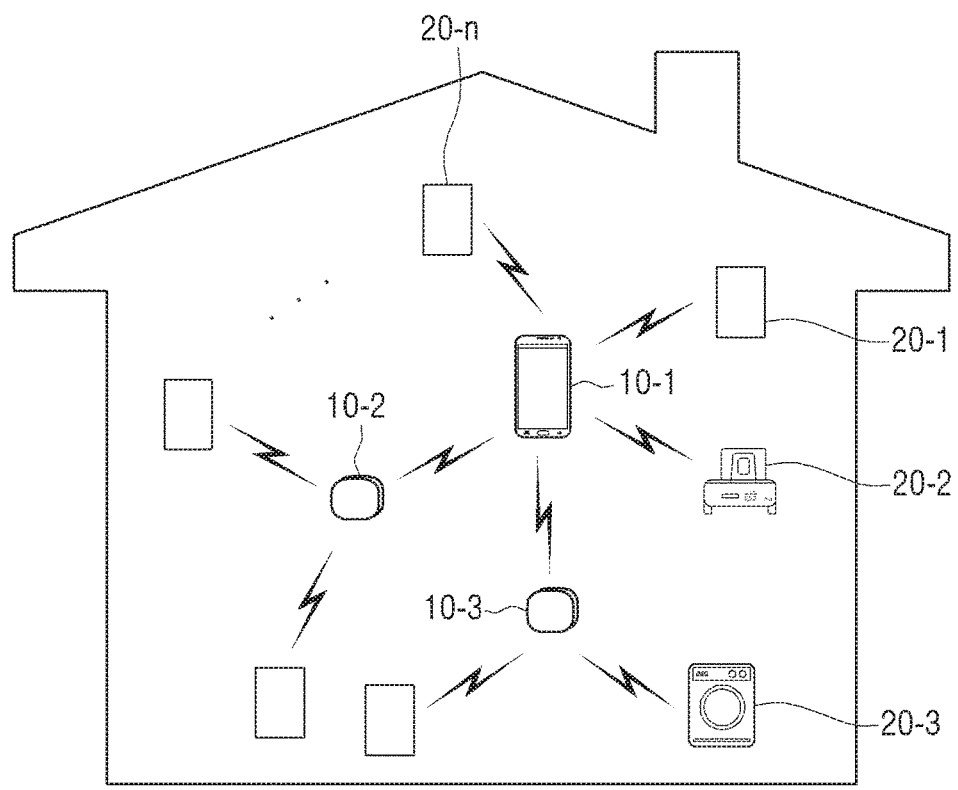

FIGS. 1A and 1B are views showing examples of a normal network topology of a wireless network for providing an Internet of things (IoT) service according to various embodiments of the present disclosure. FIG. 1A illustrates a star-type network topology, and FIG. 1B illustrates a tree-type network topology.

Referring to FIG. 1A, in the star-type network topology, a single upper node (parent node) 10 communicates with a plurality of lower nodes (child nodes) 20-1 to 20-$n$.

Referring to FIG. 1B, the tree-type network topology includes a plurality of upper nodes 10-1 to 10-3, and at least one lower node 20-1, 20-2, . . . , 20-$n$ communicating with the plurality of upper nodes 10-1 to 10-3.

In such a wireless network topology, the lower nodes 20-1, 20-2, . . . , 20-$n$ transmit and receive data under management and control of the upper node 10. The upper node 10 periodically broadcasts a beacon message to the lower nodes 20, and the lower nodes 20-1, 20-2, . . . , 20-n are synchronized with the beacon message and exchange data with the upper node 10.

Referring again to FIG. 1A, the star-type topology according to an embodiment of the present disclosure may be a smart home in which IoT of a single hop type including a single upper node 10 is established. For example, the upper node 10 may be a smartphone which controls electronic devices connected with one another via a wireless network in the smart home. The plurality of lower nodes 20-1, 20-2, . . . , 20-n may be electronic devices to which the IoT technology is applied and which are controlled by the upper node 10, the smartphone, such as an air conditioner, a window, a power switch, a washing machine, a printer, a heater, a refrigerator, etc.

Referring again to FIG. 1B, in the tree-type topology according to an embodiment of the present disclosure, a radio sensor may be attached to each of the lower nodes 20-1, 20-2, . . . , 20-n in the smart home. The upper nodes 10-2 and 10-3 may control the sensors of the electronic devices, and the upper node 10-1 may control the upper nodes 10-2 and 10-3 controlling the sensors and the lower nodes 20-1, 20-2, . . . , 20-n. However, this is merely an example, and IoT electronic devices used in various fields such as hospitals, offices, and industrial sites using wireless network technology may be the upper nodes 10-1 to 10-3 and the lower nodes 20-1, 20-2, . . . , 20-n.

According to an embodiment of the present disclosure, the IoT-based wireless network topology may use an Institute of Electrical and Electronics Engineers (IEEE) 802.15.4-based technology. The IEEE 802.15.4 standard provides an active period in which the upper node 10 and the lower node 20 exchange data with each other using their respective batteries when they communicate with each other on the wireless network, and an inactive period in which the upper node 10 and the lower node 20 enter a sleep mode when they do not exchange data, and thus do not consume power.

The IEEE 802.15.4-based wireless network provides a physical (PHY) layer and a medium access control (MAC) layer. The MAC layer provides a channel access mechanism to provide an access to a PHY channel for transmitting data, guaranteed time slot (GTS) management, beacon management, etc.

In addition, according to an embodiment of the present disclosure, in a beacon-enabled network, in response to the lower node 20 communicating with the upper node 10 during the active period, the lower node 20 is synchronized with the beacon message broadcasted by the upper node 10 and exchanges data with the upper node 10. In this case, the lower node 20 may exchange data with the upper node 10 using a slotted carrier sense multiple access with collision avoidance (CSMA-CA) using a slot, which is a channel access mechanism provided by the MAC.

According to an embodiment of the present disclosure, the active period may be divided into a first period and a second period. In addition, in response to the lower node 20 communicating with the upper node 10 in the first period, the lower node 20 and the upper node 10 may exchange data using the slotted CSMA-CA provided by the IEEE 802.15.4 standard. In response to the lower node 20 communicating with the upper node 10 in the second period, the lower node 20 and the upper node 10 may exchange data using a low-power scheduling communication method according to an embodiment of the present disclosure, which will be described below.

Figure 2:
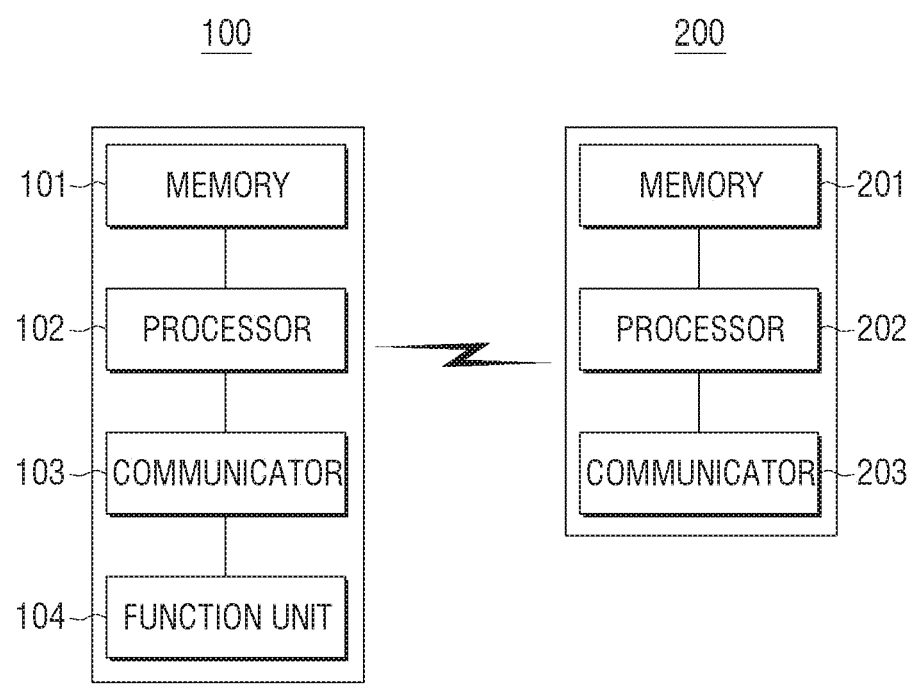
FIG. 2 is a block diagram showing configurations of an upper node and a lower node according to an embodiment of the present disclosure.

FIG. 2 is a block diagram to illustrate communication between a lower node and an upper node according to an embodiment of the present disclosure.

Referring to FIG. 2, a lower node 100 may include a memory 101, a processor 102, a communicator 103, and a function unit 104.

The memory 101 may store programs and data for implementing various functions to control the lower node 100. In addition, the memory 101 may store information on a time slot of the lower node 100 which is allocated by the processor 102 based on a priority given to the lower node 100 by the upper node 200. In addition, the memory 101 may store a beacon message including information on the priority of the lower node 100 received from the upper node 200.

Through the communicator 103, the lower node 100 may receive the beacon message from the upper node 200, and exchange data with the upper node 200 in a time slot which is allocated under control of the processor 102 and corresponds to the lower node 100. The communicator 103 may include at least one of a Wi-Fi chip (not shown), a Bluetooth chip (not shown), a wireless communication chip (not shown), and a near field communication (NFC) chip (not shown).

In particular, the Wi-Fi chip (not shown) and the Bluetooth chip (not shown) may perform communication in a Wi-Fi method (i.e., according to an IEEE 802.11 standard for wireless communication) and a Bluetooth method, respectively. The wireless communication chip (not shown) may be a chip which performs communication according to various communication standards such as IEEE, ZigBee, long term evolution (LTE), etc. According to an embodiment of the present disclosure, IEEE 802.14.5 may be used for the wireless communication chip (not shown), but this is merely an example and the present disclosure may be implemented by changing to a different wireless communication chip.

The function unit 104 may perform a corresponding function according to a type of the lower node 100. For example, when the lower node 100 is a printer in a smart home wireless network of an IoT environment, the function unit 104 may perform a printing function. When the lower node 100 is an air conditioner, the function unit 104 may perform a cooling function. When the lower node 100 is a vacuum, the function unit 104 may perform a cleaning function. However, these are merely examples. When the lower node 100 is implemented by another device, the function unit 104 may perform a corresponding function according to a type of the implemented device. In addition, the wireless network environment may be various kinds of network environments based on IoT technology, such as a hospital, a factory, an office, etc. rather than a home.

The processor 102 may control the operation of the lower node 100 and the memory 101, the communicator 103, and the function unit 104. The processor 102 may control the lower node 100 to exchange data with the upper node 200 in the time slot of the lower node 100, which is allocated by the upper node 200 based on the priority of the lower node 100. In addition, in response to the lower node 100 transmitting second data to the upper node 200 in a direct data transmission method in the second period, the processor 102 may control the lower node 100 to convert its state into an on state in the time slot corresponding to the lower node 100. In addition, in response to the transmission of the second data to the upper node 200 being completed in the time slot corresponding to the lower node 100, the processor 102 may control the lower node 100 to turn off. In response to the lower node 100 not being allocated a time slot by the upper node 200 based on a priority in the second period, the processor 102 may control the lower node 100 to transmit the second data in the direct data transmission method in the first period.

The upper node 200 according to an embodiment of the present disclosure may include a memory 201, a processor 202, and a communicator 203. The memory 201 may store programs and data for implementing various functions to control the upper node 200. In particular, the memory 201 may store relevant information, such as priority information of the lower node 100 which depends on the type and function of the lower node 100, and information on a time slot which is allocated according to a determined priority, under control the processor 202. The communicator 203 may communicate with a specific lower node 100 in a time slot which is allocated based on a priority of the lower node 100 determined under control of the processor 202. In addition, the communicator 203 may transmit a beacon frame to a physical channel under control of the processor 202. The communicator 203 may include at least one of a Wi-Fi chip (not shown), a Bluetooth chip (not shown), a wireless communication chip (not shown), and an NFC chip (not shown).

In particular, the Wi-Fi chip (not shown) and the Bluetooth chip (not shown) may perform communication in a Wi-Fi method and a Bluetooth method, respectively. The wireless communication chip (not shown) may be a chip which performs communication according to various communication standards such as IEEE, ZigBee, LTE, etc. According to an embodiment of the present disclosure, IEEE 802.14.5 may be used for the wireless communication chip (not shown), but this is merely an example and embodiments of the present disclosure may be implemented by changing to a different wireless communication chip.

The processor 202 may control the operation of the upper node 200 and the memory 201 and the communicator 203. The processor 202 may receive an acknowledgement message from the lower node 100.

In addition, according to an embodiment of the present disclosure, the processor 202 may determine a priority of the lower node 100 according to the type of the lower node 100, and may allocate a specific time slot to the lower node 100 based on the determined priority. In this case, the priority of the lower node 100 may be determined considering a signal which is exchanged when the lower node 100 communicates with another lower node 100 or a signal request which is transmitted to the upper node 200 by the lower node 100. However, this is merely an example, and the upper node 200 may determine the priority of the lower node 100 considering various methods and the function and type of the lower node 100. The processor 202 may transmit information related to the determined priority to the lower node 100. In this case, the priority information may be included in a beacon message to be transmitted.

The processor 202 may control the operation of the upper node 200 and the memory 201 and the communicator 203. The processor 202 may control the upper node 200 to exchange data with the lower node 100 in the time slot which is allocated based on the determined priority of the lower node 100. In addition, in response to the upper node 200 receiving data from the lower node 100 through the communication method of the present disclosure in the second period, the processor 202 may control the upper node 200 to receive the second data from the lower node 100 which is in the turned-on time slot in the direct data transmission method. In addition, in response to the lower node 100 not being allocated a time slot by the upper node 200 based on a priority in the second period, the processor 202 may control the upper node 200 to receive the second data from the lower node 100 in the direct data transmission method during the first period.

Figure 3:
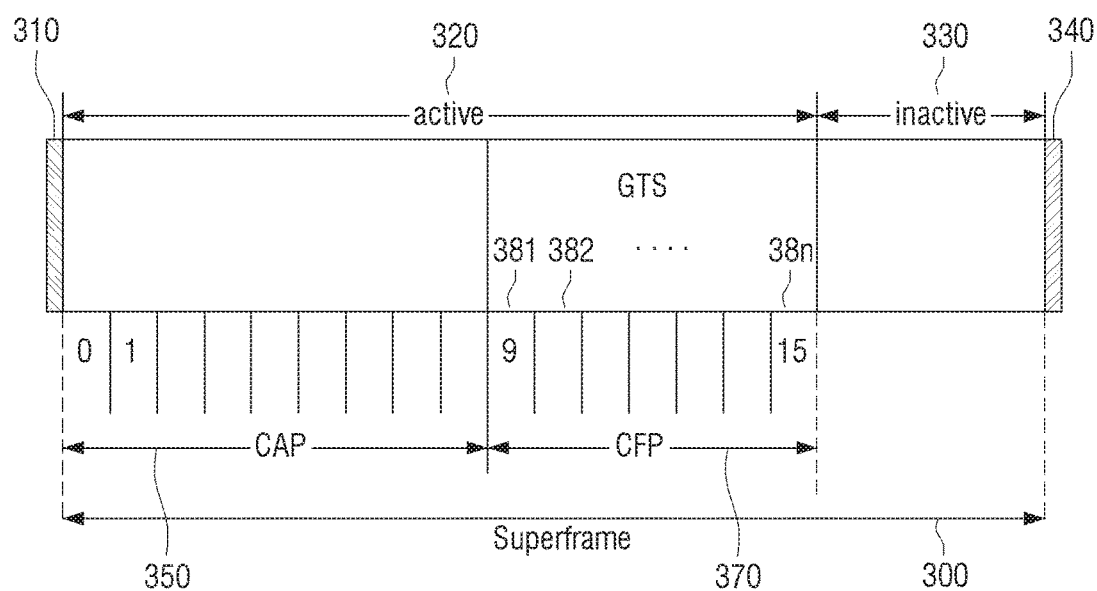
FIG. 3 is a view showing a structure of a superframe which is used in an Institute of Electrical and Electronics Engineers (IEEE) 802.15.4 system according to an embodiment of the present disclosure.

FIG. 3 is a view showing a structure of a superframe which is used in a wireless network using IEEE 802.15.4 according to an embodiment of the present disclosure.

Referring to FIG. 3, communication between an upper node 10 and a lower node 20 may be performed according to a superframe based on IEEE 802.15.4.

The superframe 300 is formed of an active period 320 and an inactive period 330 between continuous beacon messages 310 and 340. The active period 320 may be divided into a contention access period (CAP) 350 which leads from the beacon message period 310, 340, and a contention free period (CFP) 370 which leads from the CAP.

The upper node 10 or the lower node 20 may exchange data in the CAP 350 or CFP 370, and convert their state into a sleep mode in the inactive period 330 every time the active period 320 ends, and thus is controlled to save consumed power. In response to the lower node 20 being in the on state in the active period 320, the lower node 20 can exchange data with the upper node 10. The lower node 20 transitions into the off state in the inactive period 330, thereby saving consumed power.

According to an embodiment of the present disclosure, the active period 320 of the IEEE 802.14.5 superframe is formed of 16 time slots in total. A data transmission period may be the CAP 350 which is a first period, and the CFP 370 which is a second period. The second period 370 is formed of guaranteed time slots (GTSs) 381, 382, . . . , 38n, and the upper node 10 may allocate the GTSs 381, 382, . . . , 38n to a specific lower node 20 according to a request of the lower node 20 or the function or type of the lower node 20. The second period 370 may have at most seven GTSs 381, 382, . . . , 38n (n is a number from 1 to 7). Therefore, there may be seven lower nodes 20 corresponding to the allocated GTSs as lower nodes for supporting a quality of service (QoS) in the IEEE 802.15.4 superframe structure.

According to an embodiment of the present disclosure, the operation modes of the upper node 10 and the lower node 20 in the beacon-enabled IEEE 802.15.4 wireless network are as follows. When the lower node 20 wants to access a channel, the lower node 20 may use a scheduling-based channel access method through a designated time slot.

In this case, the lower node 20 may be allocated one time slot from among the GTSs 381, 382, 38n (n is number from 1 to 7) which are allocated by the upper node 10 according to a priority of the lower node 20, and perform communication in a scheduling method. In this case, the lower nodes 20-1, 20-2, . . . , 20-n, which can directly communicate with the upper node 10, 10-2, may request an independent time slot from the upper node 10, 10-2 through a GTS request frame. The upper node 10 may transmit information indicating whether time slots are allocated to the lower nodes 20-1, 20-2, . . . , 20-n to the lower node 20 through a beacon message.

According to an embodiment of the present disclosure, the upper node 10 may be a smartphone in a smart home, and the lower nodes 20-1, 20-2, . . . , 20-n may be seven IoT devices, such as a cordless vacuum 20-1, a washing machine 20-2, a door locking device 20-3, an electric heater 20-4, a window 20-5, a power switch 20-6, and an air conditioner 20-7. In this case, the smartphone which is the upper node 10 may determine priorities of the lower nodes considering the types and communication methods of the seven electronic devices.

For example, the smartphone, which is the upper node 10, may determine the priority of the lower node 20-3, which is the door locking device, as a first priority in order to prevent theft, and may determine the priority of the lower node 20-4, which is the electric heater, as a second priority in order to prevent a fire. In this case, in response to the door locking device 20-3 having the first priority having second data to transmit to the smartphone, which is the upper node 10, the door locking device 20-3 may turn on in the time slot 381 period which is allocated according to the priority. In response to the door locking device, which is the lower node 20-3, being in the on state in the time slot 381 allocated thereto, the door locking device may transmit the second data to the smartphone, which is the upper node 20. In response to the door locking device 20-3 completing the transmission of the second data to the smartphone, the door locking device may turn off, and the electric heater 20-4 having the second priority may turn on in the next time slot 382.

However, the above-described example is just for easy understanding of the present disclosure, and the upper node 10 may be implemented to determine the priority of the lower node 20 in various methods. In addition, the lower node 20 may be implemented to request the GTSs 381, 382, . . . , 38n from the upper node 10 in various methods according to the function and communication type of the lower node 20.

The term "first data" used in various embodiments of the present disclosure may mean "downlink data." The "downlink data" may refer to data which is transmitted from the upper node 10 to the lower node 20. The term "second data" may mean "uplink data." The "uplink data" may refer to data which is transmitted from the lower node 20 to the upper node 10.

In addition, the term "indirect data transmission" may mean a state in which the upper node 10 prepares the first data to transmit to the lower node 20 and transmits the first data in response to a request (ACK) of the lower node 20. The term "direct data transmission" may mean a state in which the lower node 20 transmits the second data regardless of a request of the upper node 10. The term "first period" refer to a CAP, and the term "second period" may refer to a CFP. Allocating a time slot to the lower node 20 based on a priority may refer to allocating a "GTS" to the lower node. However, these are merely examples for easy explanation of the various embodiments of the present disclosure, and the present disclosure may be implemented using terms "third period," "third data," "fourth period," "fourth data," etc.

The terms "on" and "off" used in various embodiments of the present disclosure may refer to turning on/off a radio frequency (RF) transceiver which is embedded in the lower node 20 or an RF transceiver of a sensor which is attached to the lower node 20. In response to the lower node 20 not corresponding to a time slot allocated thereto, the lower node 20 may turn off the RF transceiver. However, this is merely an example for easy explanation of the present disclosure. In response to the lower node 20 communicating with the upper node 10, another chip controlling communication of the lower node 20 may be controlled to be turned on/off.

Figure 4:
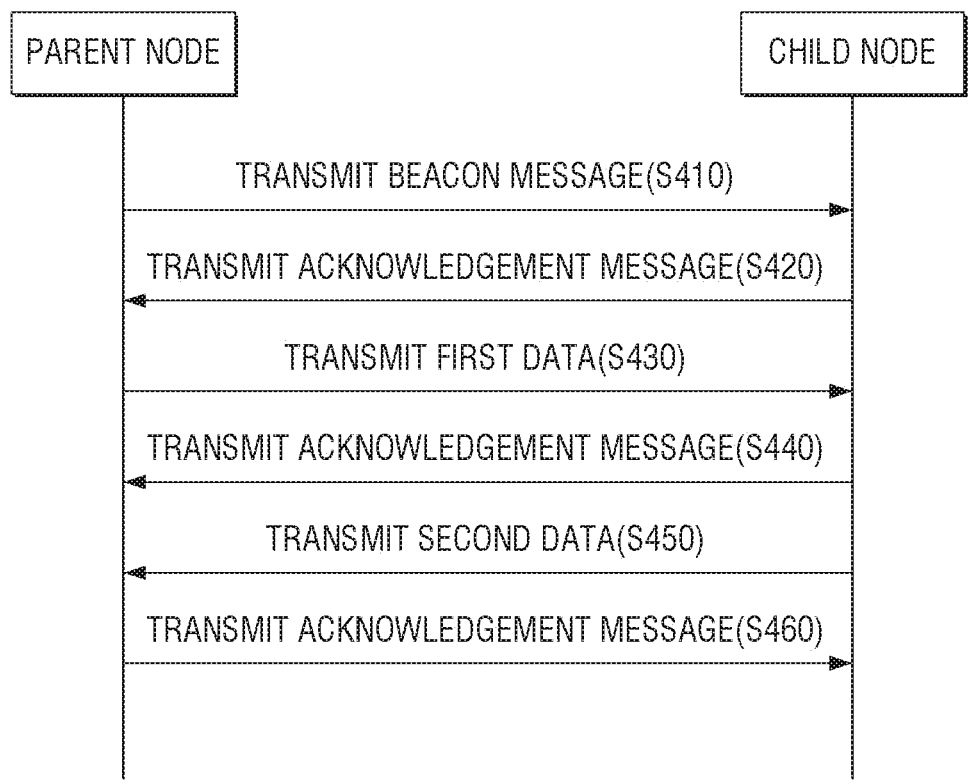
FIG. 4 is a flowchart showing a communication procedure which is performed one to one in an upper node and a lower node during an active period according to an embodiment of the present disclosure.

FIG. 4 is a flowchart showing a communication procedure which is performed one to one in an upper node (parent node) and a lower node (child node) during the active period according to an embodiment of the present disclosure.

Referring to FIG. 4, the upper node 10 transmits a beacon message to the lower node 20 prior to entering the active period 320 at operation S410. In this case, the upper node 10 may periodically broadcast the beacon message to the lower node 20, and the lower node 20 may grasp the beacon message received from the upper node 10 and may be synchronized with the beacon message.

According to an embodiment of the present disclosure, the upper node 10 may determine a priority of the lower node 20 considering various factors of the lower node 20, such as a function type and a communication type, and may allocate a GTS 381, 382, . . . , 38n to the lower node 20 based on the determined priority of the lower node 20. In this case, information on the priority of the lower node 20 determined by the upper node 10, and information on the time slot allocated to the lower node 20 may be included in the beacon message and transmitted to the lower node 20 at operation S410.

The lower node 20 may analyze the beacon message received from the upper node 10, determine whether a GTS is allocated thereto according to the priority of the lower node 20 determined by the upper node, and transmit an acknowledgement message to the upper node 10 at operation S420.

The upper node 10 may transmit the first data to the lower node 20 at operation S430. In this case, the first data may be transmitted to the lower node 20 in the CAP 350, which is the first period of the active period 320, in the indirect data transmission method. In this case, the lower node 20 may communicate with the upper node 10 regardless of whether the time slot is allocated according to the priority determined by the upper node 10.

According to an embodiment of the present disclosure, the lower node 20 may transmit and receive the downlink data, which is the first data transmitted from the upper node 10, in the CAP 350 which is the first period in a competition mode according to the IEEE 802.15.4 standard. The upper node 10 may make a data reception request by periodically transmitting the first data to the lower node 20. In response to the lower node 20 receiving the first data, the lower node 20 may turn on. In response to the lower node 20 receiving the first data from the upper node 10, the lower node 20 may transmit an acknowledgement message (ACK) to the upper node 10 at operation S440. The lower node 20 may transmit the acknowledgement message to the upper node 10 in the on state, and may receive the first data from the upper node 10. The upper node 10 may receive the ACK from the lower node 20 and then completes the exchange of the first data.

The lower node 20 may transmit the second data to the upper node 10 at operation S450. In response to the presence of a time slot that the upper node 10 allocates to the lower node 20 according to the priority of the lower node 20, the lower node 20 may exchange the second data with the upper node 10 in a time slot corresponding to the lower node 20 in the direct data transmission method. When the number of time slots designated by the upper node 10 is N and the number of lower nodes 20 communicating with the upper node 10 is less than or equal to N, the upper node 10 may allocate N number of GTSs to the lower nodes 20 so that the lower nodes 20 can transmit the second data in the second period. The lower node 20 may transmit the second data to the upper node 10 in the corresponding time slot, and receive an acknowledgement message from the upper node 10 at operation S460 and thus complete the exchange of the second data.

According to an embodiment of the present disclosure, the IEEE 802.15.4 standard provides seven GTSs 381,

382, ..., 38*n* (n is number from 1 to 7) in the CFP 370, which is the second period, to provide a QoS to a specific lower node 20.

According to an embodiment of the present disclosure, in response to the number (N) of lower nodes 20 communicating with the upper node 10 being less than or equal to 7, the upper node 10 may determine the priority of the lower node 20. The upper node 10 may allocate a time slot of a same period to each of the N number of lower nodes 20 one to one according to the priority of the lower node 20 determined by the upper node 10.

In this case, each of the N lower nodes 20 may turn on during an allocated time in the allocated time slot, and the lower nodes 20 in the on state may transmit the second data to the upper node 10 in the second period. In this case, the second data may be transmitted in the direct data transmission method regardless of a data request of the upper node 10.

In response to the second data being received from the lower node 20 which is in the on state in the allocated time slot, the upper node 10 may transmit an acknowledgement message to the lower node 20 at operation S460. The lower node 20 receives the acknowledgement message from the upper node 10, and then completes the transmission of the second data.

On the other hand, in response to the N number of lower nodes 20 communicating with the upper node 10 exceeding 7, the upper node 10 may allocate the GTSs 381, 382, ..., 38*n* to the lower nodes 20 having the first to seventh priorities from among the N number of lower nodes 20. The upper node 10 may allocate the time slots 381, 382, ..., 387 of the same period to the lower nodes 20 having the first to seventh priorities one to one.

In this case, each of the seven lower nodes 20 may turn on during an allocated time in the time slot allocated thereto, and may transmit the second data to the upper node 10 in the second period in the direct data transmission method. The upper node 10 may receive the second data which is transmitted by the lower node 20 in the on state in the corresponding time slot.

In response to the second data being received from the lower node 20 which is in the on state in the allocated time slot, the upper node 10 may transmit an acknowledgement message to the lower node 20 at operation S460. The lower node 20 receives the acknowledgement message from the upper node 10, and then completes the transmission of the second data.

In addition, the N−7 number of lower nodes 20 which do not have the first to seventh priorities may transmit the second data to the upper node 10 in the first period in the direct data transmission method. In this case, the upper node may receive the second data from the N−7 number of lower nodes 20 in the first period.

In response to the second data being received from the lower node 20 which is in the on state, the upper node 10 may transmit an acknowledgement message to the lower node 20 at operation S460. The lower node 20 may receive the acknowledgement message from the upper node 10, and then complete the transmission of the second data.

Figure 5:
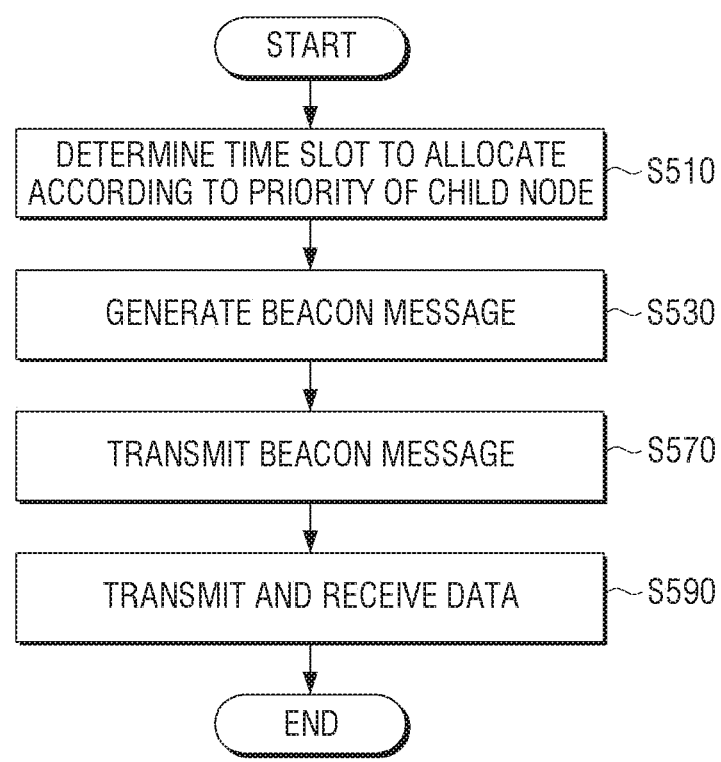
FIG. 5 is a sequence diagram showing a communication procedure in the upper node during an active period according to an embodiment of the present disclosure.

FIG. 5 is a sequence diagram showing a data exchange procedure of an upper node in a wireless network according to an embodiment of the present disclosure.

Referring to FIG. 5, the upper node 10 may determine a time slot to allocate according to a priority of the lower node 20 prior to generating a beacon message to transmit to the lower node 20 at operation S510. The upper node 10 may generate the beacon message to transmit to the lower node 20 at operation S530. In this case, the beacon message may include information on the priority of the lower node 20, and information on the time slot allocated according to the priority. The upper node 10 may transmit the generated beacon message to the lower node at operation S570, and may exchange data with the lower node 20 based on the information included in the beacon message at operation S590.

According to an embodiment of the present disclosure, the upper node 10 may determine the priorities of the plurality of lower nodes 20 communicating therewith based on information on the lower nodes 20, and may allocate GTSs. According to an embodiment of the present disclosure, the IEEE 802.15.4 standard provides seven GTSs 381, 382, ... 38*n* to specific lower nodes 20 to provide a QoS to the lower nodes 20 in the CFP 370, which is the second period.

According to an embodiment of the present disclosure, the upper node 10 may receive, from the lower node 20, the uplink data, which is the second data transmitted regardless of a data request of the upper node 10, in the CFP 370, which is the second period. Accordingly, in response to the lower node 20 having the second data to transmit to the upper node 10, the upper node 10 may allocate the time slots 381, 382, ... 38*n* (n is a number from 1 to 7) of the same period to at most seven lower nodes 20 one to one in the second period according to the priorities of the lower nodes 20 determined by the upper node 10.

For example, in response to the N number of lower nodes 20 communicating with the upper node 10 being less than or equal to 7, the upper node 10 may determine the priority of each of the N number of lower nodes 20. The upper node 10 may allocate time slots from 1 to N to the lower nodes 20 according to the priorities of the lower nodes 20.

On the other hand, in response to the N number of lower nodes 20 communicating with the upper node 10 exceeding 7, the upper node 10 may determine the priority of each of the seven lower nodes 20. In this case, the upper node 10 may allocate time slots from 1 to 7 to the lower nodes having the first to seventh priorities.

The beacon message generated by the upper node 10 may include information on a data transmission period in which the upper node 10 can communicate with the lower node 20. According to the IEEE 802.15.4 standard, in response to the upper node 10 having the downlink data (i.e., the first data), to transmit to the lower node 20, the upper node 10 may transmit the first data to the lower node 20 in the CAP 350, which is the first period. On the other hand, in response to the lower node 20 having the uplink data (i.e., the second data), to transmit to the upper node 10, the upper node 10 may determine that the lower node 20 will transmit the second data to the upper node 10 in the CFP 370, which is the second period.

In this case, in response to the upper node 10 communicating with the lower node 20, the upper node 10 may determine that the upper node 10 will exchange the downlink data, which is the first data, in the CAP 350, which is the first period, in the indirect data transmission method. In addition, in response to the upper node 10 communicating with the lower node 20, the upper node 10 may determine that the upper node 10 will exchange the uplink data, which is the first data, in the CFP 370, which is the second period, in the direct data transmission method.

In addition, the upper node 10 may determine that the upper node 10 will exchange the second data in a time slot allocated according to the priority of the lower node 20 in the second period 370. According to an embodiment of the present disclosure, the IEEE 802.15.4 standard may provide the GTSs 381, 382, . . . , 38n of the same period, which correspond to the priorities of at most seven lower nodes 20 one to one from among the N number of specific lower nodes 20 communicating with the upper node 10, in order to provide a QoS to the lower nodes 20 in the CFP which is the second period.

In response to the number of lower nodes 20 communicating with the upper node 10 being 5, the upper node 10 may allocate the GTSs 381, 382, . . . , 38n to the lower nodes 20 one to one based on the priorities of the five lower nodes 20.

For example, the upper node 10 in an IoT-based smart home on a wireless network may be a smartphone, and the lower nodes 20 may be an air conditioner 20-1, a washing machine 20-2, a window 20-3, an electric heater 20-4, and a gas stove 20-5, which are based on the IoT. The upper node 10 may determine the air conditioner 20-1 to have the first priority, the washing machine 20-2 to have the second priority, the window 20-3 to have the third priority, the electric heater 20-4 to have the fourth priority, and the gas stove 20-5 to have the fifth priority. The above-described method for the upper node 10 to determine the priorities of the lower nodes 20 is merely an example for easy explanation of the present disclosure. The upper node 10 may determine the priorities of the lower nodes 20-1, 20-2, . . . , 20-n in various methods such as according to the functions and communication types of the lower nodes 20-1, 20-2, . . . , 20-n.

In this case, the smartphone, which is the upper node 10, may allocate the time slots according to the priorities of the lower nodes 20, the air conditioner 20-1, the washing machine 20-2, the window 20-3, the electric heater 20-4, and the gas stove 20-5. For example, the smartphone may allocate the air conditioner 20-1 of the first priority the time slot 381 of the first period from among the seven time slots provided in the CFP 370, allocate the washing machine 20-2 of the second priority the time slot 382 of the second period, allocate the window 20-3 of the third priority the time slot 383 of the third period, allocate the electric heater 20-4 of the fourth priority the time slot 384 of the fourth period, and allocate the gas stove 20-5 of the fifth priority the time slot 385 of the fifth period.

In addition, each of the devices which are the lower nodes 20 turn on in the time slot allocated thereto based on the priority of each device, and the smart phone which is the upper node 10 may receive the uplink data, which is the second data, from the lower nodes 20 which are in the on state in the CFP 370, which is the second period, in the direct data transmission method.

According to an embodiment of the present disclosure, if eight lower nodes 20 are communicating with the upper node 10, the upper node 10 may determine the priorities of the seven lower nodes 20, and allocate the GTSs 381, 382, . . . , 38n one by one according to the determined priorities.

For example, the upper node 10 in the smart home may be a smartphone, and the lower nodes 20 may be an air conditioner 20-1, a washing machine 20-2, a window 20-3, an electric heater 20-4, a gas stove 20-5, a cleaner 20-6, a lamp switch 20-7, and a television (TV) 20-8, which are based on the IoT. The upper node 10 may determine the air conditioner 20-1 to have the first priority, the washing machine 20-2 to have the second priority, the window 20-3 to have the third priority, the electric heater 20-4 to have the fourth priority, the gas stove 20-5 to have the fifth priority, the cleaner 20-6 to have the sixth priority, the lamp switch 20-7 to have the seventh priority, and the TV 20-8 to have the eighth priority. The above-described method for the upper node 10 to determine the priorities of the lower nodes 20 is merely an example for easy explanation of the present disclosure. The upper node 10 may determine the priorities of the lower nodes 20 in various methods such as according to the functions and communication types of the lower nodes 20.

In this case, the smartphone, which is the upper node 10, may allocate the time slots according to the priorities of the lower nodes 20, the air conditioner 20-1, the washing machine 20-2, the window 20-3, the electric heater 20-4, the gas stove 20-5, the cleaner 20-6, and the lamp switch 20-7. For example, the smartphone may allocate the air conditioner 20-1 of the first priority the time slot 381 of the first period from among the seven time slots provided in the CFP 370, allocate the washing machine 20-2 of the second priority the time slot 382 of the second period, allocate the window 20-3 of the third priority the time slot 383 of the third period, allocate the electric heater 20-4 of the fourth priority the time slot 384 of the fourth period, allocate the gas stove 20-5 of the fifth priority the time slot 385 of the fifth period, allocate the cleaner 20-6 of the sixth priority the time slot 386 of the sixth period, and allocate the lamp switch 20-7 of the seventh priority the time slot 387 of the seventh period.

In this case, each of the devices which are the lower nodes 20 may turn on state in the time slot 381, 382, . . . , 38n allocated thereto based on the priority of each device, and the smart phone which is the upper node 10 may receive the uplink data, which is the second data, from the lower nodes 20 which are in the on state in the CFP 370, which is the second period, in the direct data transmission method. In addition, in the case of the TV 20-8 of the eighth priority which is not allocated any of the seven time slots provided in the CFP 370, in response to the TV 20-8 which is the lower node 20 transmitting the second data to the smart phone which is the upper node 10, the upper node 10 may receive the second data transmitted by the TV 20-8 in the first period 350.

The above-described examples are merely embodiments for easy understanding of the present disclosure, and the various embodiments of the present disclosure can be implemented in electronic devices connected based on the IoT technology in other wireless network environments in addition to the smart home.

Figure 6:
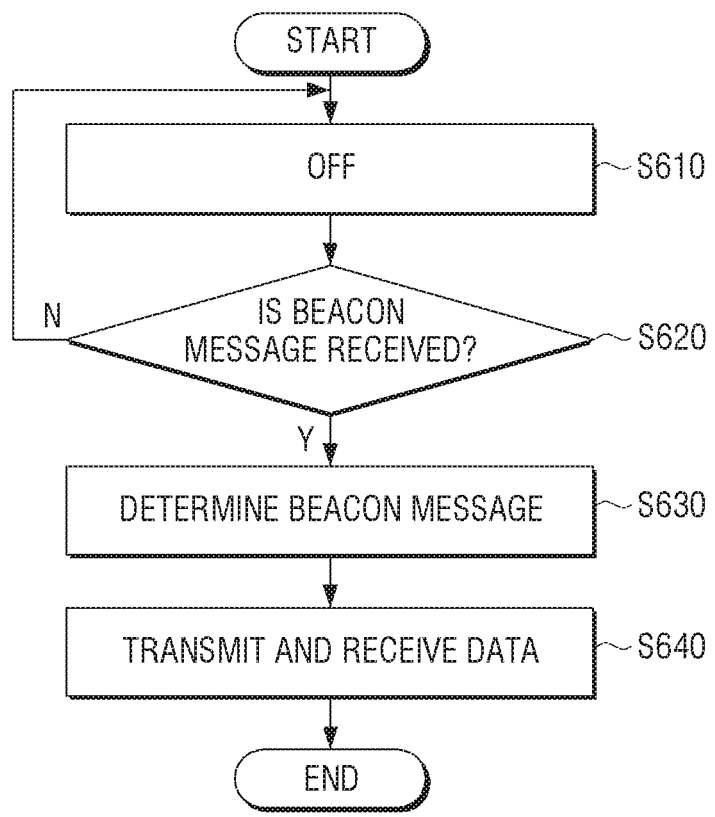
FIG. 6 is a sequence diagram showing a communication procedure in the lower node during an active period according to an embodiment of the present disclosure.

FIG. 6 is a sequence diagram showing a communication procedure of a lower node 20 according to an embodiment of the present disclosure.

Referring to FIG. 6, the lower node 20 starts in an off state at operation S610. The lower node 20 receives a beacon message from the upper node 10 to communicate with the upper node 10 at operation S620. The lower node 20 may determine the received beacon message at operation S630. In this case, in determining the beacon message, the lower node 20 may determine the priority of the lower node 20 which is determined by the upper node 10 in various methods such as according to the function and type of the lower node 20. In addition, the lower node 20 may determine a time slot allocated thereto in the second period 370 by the upper node 20 based on the determined priority.

The lower node 20 may be synchronized with the received beacon message and exchange data with the upper node 10 at operation S640. In this case, in response to the lower node 20 intending to transmit the second data regardless of a data request of the upper node 10, the second data may be transmitted in the direct data transmission method. The upper node 10 may transmit the first data to the lower node 20 in the indirect data transmission method.

In response to the lower node 20 transmitting the second data to the upper node 10, the lower node 20 may transmit the second data in the second period in the direct data transmission method. In addition, in response to the lower node 20 receiving the first data from the upper node 10, the lower node 20 may receive the first data in the first period in the indirect data transmission method.

The lower node 20 may determine a data transmission period of the lower node 20 according to the time slot allocated according to the priority of the lower node 20 which is determined by the upper node 10. According to an embodiment of the present disclosure, in response to the number of determined priorities and allocated time slots in the lower node 20 being less than or equal to N number of time slots designated by the upper node 10 in the second period, the lower node 20 may transmit the second data to the upper node 10 in the second period.

On the other hand, in response to the number of lower nodes 20 communicating with the upper node 10 exceeding N number of time slots designated by the upper node 10 in the second period, the N number of lower nodes 20 may transmit the second data to the upper node 10 in the second period. The lower nodes 20 having priorities lower than the Nth priority may transmit the second data to the upper node 10 in the first period.

According to an embodiment of the present disclosure, the IEEE 802.15.4 standard provides seven GTSs to specific lower nodes 20 to provide a QoS to the lower nodes 20 in the CFP 370, which is the second period. According to an embodiment of the present disclosure, the lower node 20 may transmit the uplink data, which is the second data, in the CFP 370, which is the second period, in the direct data transmission method regardless of a data request of the upper node 10. Accordingly, in response to the lower node 20 having the second data to transmit to the upper node 10, at most seven lower nodes 20 may be allocated time slots of the same period by the upper node 10 one to one in the second period according to the priorities of the lower nodes 20 determined by the upper node 10.

For example, in response to the N number of lower nodes 20 communicating with the upper node 10 being less than or equal to 7, the N number of lower nodes 20 may determine their respective priorities which are determined by the upper node 10. The childe nodes 20 may be allocated time slots from 1 to N by the upper node 10 one to one according to the priorities determined by the upper node 10.

On the other hand, in response to the N number of lower nodes 20 communicating with the upper node 10 exceeding 7, the seven lower nodes 10 may determine their respective priorities which are determined by the upper node 10. In this case, the lower nodes 20 having the first to seventh priorities which are determined by the upper node 10 may be allocated time slots from the first period to the seventh period.

According to an embodiment of the present disclosure, in response to the number of lower nodes 20 communicating with the upper node 10 being 5, the upper node 10 may determine priorities of the five lower nodes 20, and allocate GTSs to the lower nodes 20 one to one according to the determined priorities.

Specifically, for example, the upper node 10 in a smart home may be a smartphone, and the lower nodes 20 may be an air conditioner 20-1, a washing machine 20-2, a window 20-3, an electric heater 20-4, and a gas stove 20-5, which are based on the IoT. The air conditioner 20-1 may be determined to have the first priority, the washing machine 20-2 may be determined to have the second priority, the window 20-3 may be determined to have the third priority, the electric heater 20-4 may be determined to have the fourth priority, and the gas stove 20-5 may be determined to have the fifth priority by the smartphone, which is the upper node 10. The above-described method for the upper node 10 to determine the priorities of the lower nodes 20 is merely an example for easy explanation of the present disclosure. The upper node 10 may determine the priorities of the lower nodes 20 in various methods such as according to the functions and communication types of the lower nodes 20.

In addition, each of the devices which are the lower nodes 20 turn on in the time slot allocated thereto based on the priority of each device, and may transmit the uplink data, which is the second data, to the smartphone which is the upper node 10, in the allocated time slots 381, 382, 383, 384, and 385 in the CFP 370, which is the second period, in the direct data transmission method.

For example, the air conditioner 20-1 which is determined to have the first priority may be allocated the time slot 381 of the first period from among the seven time slots provided in the CFP 370, the washing machine 20-2 which is determined to have the second priority may be allocated the time slot 382 of the second period, the window 20-3 which is determined to have the third priority may be allocated the time slot 383 of the third period, the electric heater 20-4 which is determined to have the fourth priority may be allocated the time slot 384 of the fourth period, and the gas stove 20-5 which is determined to have the fifth priority may be allocated the time slot 385 of the fifth period.

According to an embodiment of the present disclosure, if eight lower nodes 20 are communicating with the upper node 10, the lower nodes 20 may determine the priorities of the lower nodes 20 which are determined by the upper node 10, and may be allocated GTSs 381, 382, . . . , 387 one by one according to the determined priorities.

For example, the upper node 10 in the smart home may be a smartphone, and the lower nodes 20 may be an air conditioner 20-1, a washing machine 20-2, a window 20-3, an electric heater 20-4, a gas stove 20-5, a cleaner 20-6, a lamp switch 20-7, and a TV 20-8, which are based on the IoT. The air conditioner 20-1 may be determined to have the first priority, the washing machine 20-2 may be determined to have the second priority, the window 20-3 may be determined to have the third priority, the electric heater 20-4 may be determined to have the fourth priority, the gas stove 20-5 may be determined to have the fifth priority, the cleaner 20-6 may be determined to have the sixth priority, the lamp switch 20-7 may be determined to have the seventh priority, and the TV 20-8 may be determined to have the eight priority by the upper node 10. The above-described method for the upper node 10 to determine the priorities of the lower nodes 20 is merely an example for easy explanation of the present disclosure. The upper node 10 may determine the priorities of the lower nodes 20 in various methods such as according to the functions and communication types of the lower nodes 20.

In this case, the lower nodes 20, which are the IoT devices, may be allocated time slots one to one in the second period according to priorities of the air conditioner 20-1, the washing machine 20-2, the window 20-3, the electric heater 20-4, the gas stove 20-5, the cleaner 20-6, and the lamp switch 20-7, which are determined by the smartphone, which is the upper node 10. For example, the air conditioner 20-1 which is determined to have the first priority may be allocated the time slot 381 of the first period from among the seven time slots provided in the CFP 370, the washing machine 20-2 which is determined to have the second priority may be allocated the time slot 382 of the second period, the window 20-3 which is determined to have the third priority may be allocated the time slot 383 of the third period, the electric heater 20-4 which is determined to have the fourth priority may be allocated the time slot 384 of the fourth period, the gas stove 20-5 which is determined to have the fifth priority may be allocated the time slot 385 of the fifth period, the cleaner 20-6 which is determined to have the sixth priority may be allocated the time slot 386 of the sixth period, and the lamp switch 20-7 which is determined to have the seventh priority may be allocated the time slot 387 of the seventh period.

Each of the devices which are the lower nodes 20 may turn on in the time slot allocated thereto based on the priority of each device, and may transmit the uplink data, which is the second data, to the smartphone which is the upper node 10, in the CFP 370, which is the second period, in the direct data transmission method. In addition, the TV 20-8 of the eighth priority which is not allocated any of the seven time slots provided in the CFP 370 may transmit the uplink data which is the second data to the smartphone which is the upper node 10 in the first period 350 in the direct data transmission method.

The above-described examples are merely embodiments for easy understanding of the present disclosure, and the various embodiments of the present disclosure can be implemented in electronic devices connected based on the IoT technology in other wireless network environments in addition to the smart home.

Figure 7A:
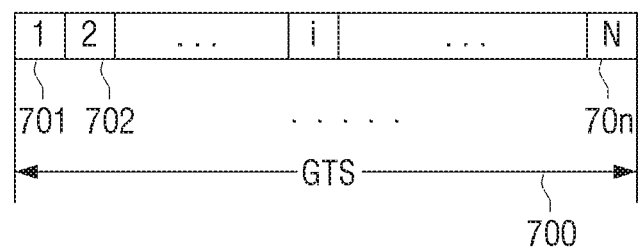
FIG. 7A is a view to explain allocating time slots to lower nodes in the second period in response to the number of lower nodes communicating with an upper node being less than or equal to N number of priorities according to an embodiment of the present disclosure.
Figure 7B:
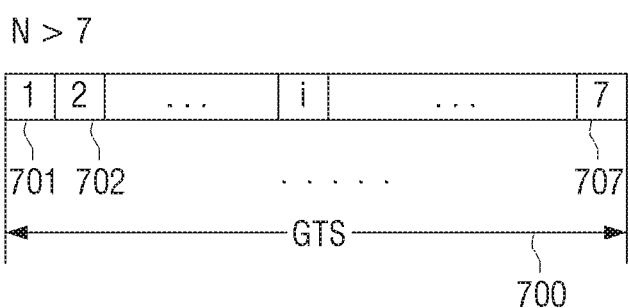
FIG. 7B is a view to explain allocating time slots to lower nodes in the second period when the number of lower nodes communicating with an upper node exceeds N number of priorities according to an embodiment of the present disclosure.

FIGS. 7A and 7B are views to illustrate allocating time slots to lower nodes in a second period in response to the number of lower nodes communicating with an upper node being less than or equal to or exceeding N number of priorities, respectively, according to various embodiments of the present disclosure.

Referring to FIGS. 7A and 7B, a second period 700 (e.g., the second period 370) in a wireless network may have time slots having N number of priorities to provide a QoS according to a type of a lower node. In response to the number of lower nodes 20 communicating with the upper node 10 being less than or equal to N, the upper node 10 may determine the priorities of the lower nodes 20, and allocate specific time slots to the lower nodes 20 based on the determined priorities.

In response to the lower node 20 having the second data to transmit to the upper node 10, the lower node 20 may transmit a specific time slot allocation request to the upper node 10 and may request time slot allocation (not shown). In this case, the upper node 10 may determine the priority of the lower node 20 considering a type of data transmission and a type of signal use of the lower node 20 (not shown).

In addition, the upper node 10 may transmit a beacon message including information on the priority of the lower node 20 which is determined by the upper node 10 to the lower node 20 (not shown). In this case, the lower node 20 may exchange the first data with the upper node 10 using the time slot period which is allocated according to the priority of the lower node 20 received from the upper node 10.

For example, according to an embodiment of the present disclosure, the IEEE 802.15.4 standard provides GTSs, which are the seven allocated time slots, in the CFP 370 which is the second period of the active period. The upper node 10 may determine the priority of the lower node 20 considering the type of the lower node 20 or a communication method of the lower node 20 with another device. However, this is merely an embodiment for easy understanding of the present disclosure, and the upper node 10 may determine the priority of the lower node 20 in various methods, and allocate the time slot according to the priority of the lower node 20.

Referring to FIG. 7A, according to the IEEE 802.15.4 standard, in response to the number N of lower nodes 20 having priorities being less than or equal to 7, the N number of lower nodes 20 may be allocated GTSs of the same period ($70n$, n=1, 2, ..., 7) one to one.

Referring to FIG. 7B, in response to the number N of lower nodes 20 having the priorities exceeding 7, the upper node 10 may allocate the GTSs (701 to 707) to the seven lower nodes 20 having high priorities from among the N number of lower nodes 20 one by one, and may not allocate a GTS to N−7 number of lower nodes 20. Accordingly, according to an embodiment of the present disclosure, the seven lower nodes 20 having high priorities may provide a QoS through the GTSs (701, 702, ..., 707) allocation.

In this case, the lower nodes 20 may transmit the second data to the upper node 10 in the second period 370 during the time slots 701, 702, ..., 707, which are allocated based on the priorities of the lower nodes 20 determined by the upper node 10, in the direct data transmission method. In addition, the upper node 10 may receive the second data from the lower nodes 20 in the second period 370 during the time slots 701, 702, ..., 707 allocated to the lower nodes 20.

Figure 8A:
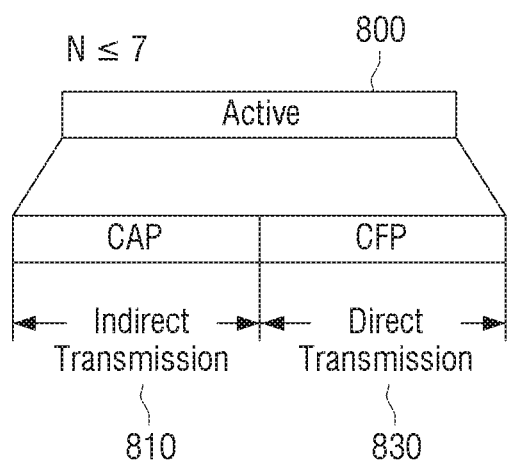
FIGS. 8A and 8B are views to explain a method for allocating a transmission period of a lower node in an active period according to a priority of the lower node communicating with an upper node according to various embodiments of the present disclosure.
Figure 8B:
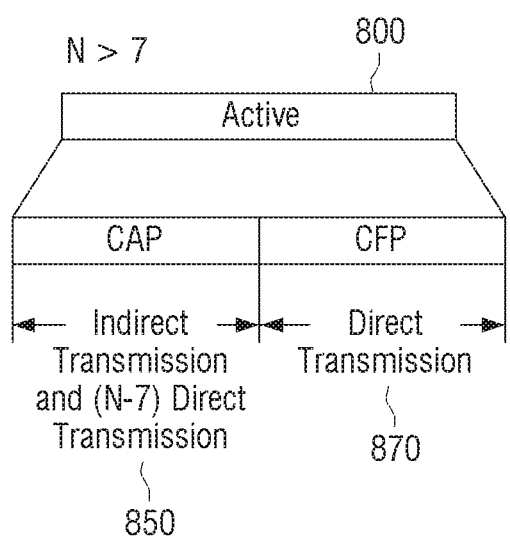

FIGS. 8A and 8B are views to illustrate a method for allocating a transmission period of a lower node in an active period according to a priority of the lower node communicating with an upper node according to various embodiments of the present disclosure.

Referring to FIGS. 8A and 8B, the division of a data transmission period and a data transmission mode may be determined by the upper node 10 and transmitted to the lower node 20 through a beacon message.

Referring to FIG. 8A, in response to the number N of lower nodes 20 having priorities determined by the upper node 10 being less than or equal to 7, and the lower nodes 20 having second data to transmit to the upper node, the N number of lower nodes 20 may transmit the second data to the upper node 10 in time slots 701, 702, ..., $70n$ (n is a number from 1 to 7) corresponding to the lower nodes 20 in a second period 830 of an active period 800. In this case, uplink data which is the second data may be transmitted in a direct data transmission mode.

In addition, in response to the upper node 10 having first data to transmit to the lower nodes 20, the lower nodes 20 may receive the first data in a first period 810 in an indirect data transmission mode.

In addition, referring to FIG. 8B, in response to the number N of lower nodes 20 communicating with the upper node 10 exceeding the number of GTSs 701, 702, ..., 707 (i.e., 7), the lower nodes 20 may transmit the second data to the upper node 10 in a second period 870 during the time slots 701, 702, ..., 707 corresponding to first to seventh priorities one to one in the direct data transmission mode.

In addition, in response to the number N of lower nodes 20 communicating with the upper node 10 exceeding the seven GTSs 701, 702, ..., 707, and the priority of the lower node 20 determined by the upper node 10 being lower than the seventh priority (for example, 8th, 9th, ..., Nth priorities), N−7 number of lower nodes 20 may transmit the second data to the upper node 10 in a first period 850 in the direct data transmission mode.

FIG. 9 is a view showing a structure of a beacon message according to the IEEE 802.15.4 standard according to an embodiment of the present disclosure.

Referring to FIG. 9, a frame control field has a length of 2 bytes (octets), and includes information defining a frame type, an addressing field, and other control flags. A frame pending sub field 901 has a length of 1 bit, and a pending bit is set to 1 in response to a frame that the upper node 10 transmits to the lower node 20 being one or more data. The frame being one or more data means that the first data that the upper node 10 transmits to the lower node 20 is one or more data. In this case, second data (traffic) may exist in the lower node 20.

In response to no frame being transmitted to the lower node 20 by the upper node 10, the pending bit is set to 0. It may be determined whether second data exists that is transmitted to a specific lower node 20 by the upper node 10 through the pending bit of the frame pending sub field.

Figure 10:
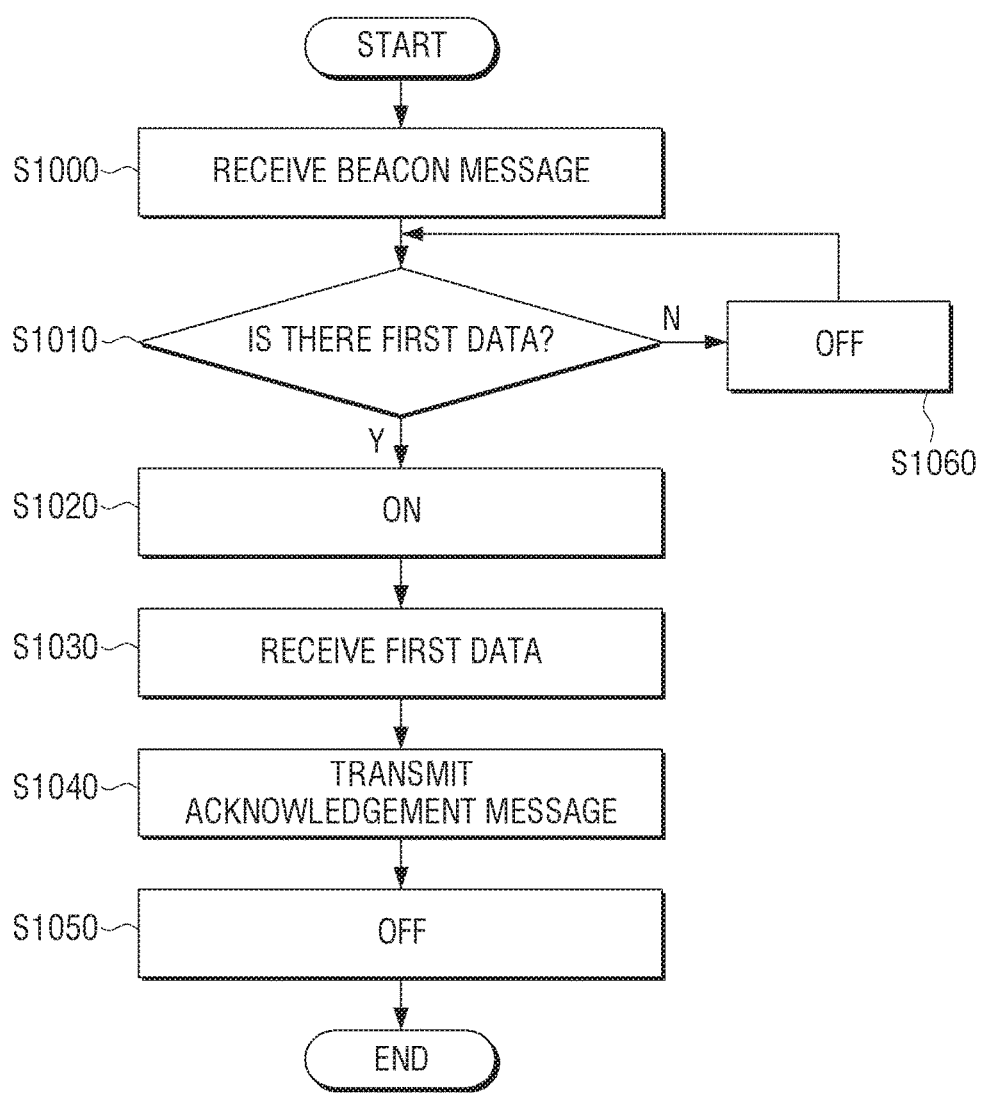
FIG. 10 is a sequence diagram showing a procedure in which a lower node receives first data from an upper node in a first period according to an embodiment of the present disclosure.

FIG. 10 is a sequence diagram to illustrate a method for a lower node to receive first data from an upper node in a first period of an active period through a frame pending sub field according to an embodiment of the present disclosure.

Referring to FIG. 10, the lower node 20 receives a beacon frame from the upper node 10 at operation S1000. In this case, the lower node 20 may determine whether there is first data that is transmitted by the upper node 10 using a frame pending sub field of a MAC layer at operation S1010. In response to the presence of the first data, the frame pending sub field is set to 1 (not shown). In addition, in response to the presence of the first data, the lower node 20 may access a channel using a CSMA/CA algorithm provided by the IEEE 802.15.4 standard (not shown).

In response to the presence of first data received from the upper node 10, the lower node 20 may turn on at operation S1020. In the on state, the lower node 20 may receive the first data from the upper node 10 at operation S1030. In response to the beacon frame succeeding in accessing a channel, the lower node 20 may receive the first data from the upper node 10 (not shown). In this case, after receiving the first data, the lower node 20 transmits an ACK to the upper node 10 at operation S1040, turns off at operation S1050, and finishes receiving data.

In response to the absence first data received by the lower node 20 from the upper node 10, the lower node 20 turns off at operation S1060, and resumes operation S1010 to determine whether the first data is received. In other words, when the lower node 20 does not receive the first data from the upper node 10, the frame pending is set to 0.

Accordingly, in response to the reception of first data by the lower node 20 from the upper node 10, the lower node 20 turns on at operation S1020, and otherwise, the lower node 20 converts its state into the off state at operation S1060, so that power consumption of the lower node 20 can be reduced.

In addition, according to the beacon-enabled IEEE 802.15.4 according to an embodiment of the present disclosure, the lower node 20 may try to access a channel using the CSMA/CA (slotted CSMA/CA) algorithm using slots in transmitting data. According to an embodiment of the present disclosure, in response to the lower node 20 exchanging the first data and the second data with the upper node 10 in the first period in communicating with the upper node 10, the beacon frame may try to access a channel using the CSMA/CA algorithm using slots. In this case, in response to the lower node 20 trying to access the channel using the CSMA/CA (slotted CSMA/CA), but failing to access the channel (not shown), the lower node 20 may turn off and thus can reduce power consumption (not shown). In this case, the lower node 20 turns on state in the next superframe (not shown), and may try to access the channel using the CSMA/CA algorithm again.

A method for the lower node 20 to transmit second data to the upper node 10 in the second period 370 according to an embodiment of the present disclosure is described below with reference to FIG. 11.

Figure 11:
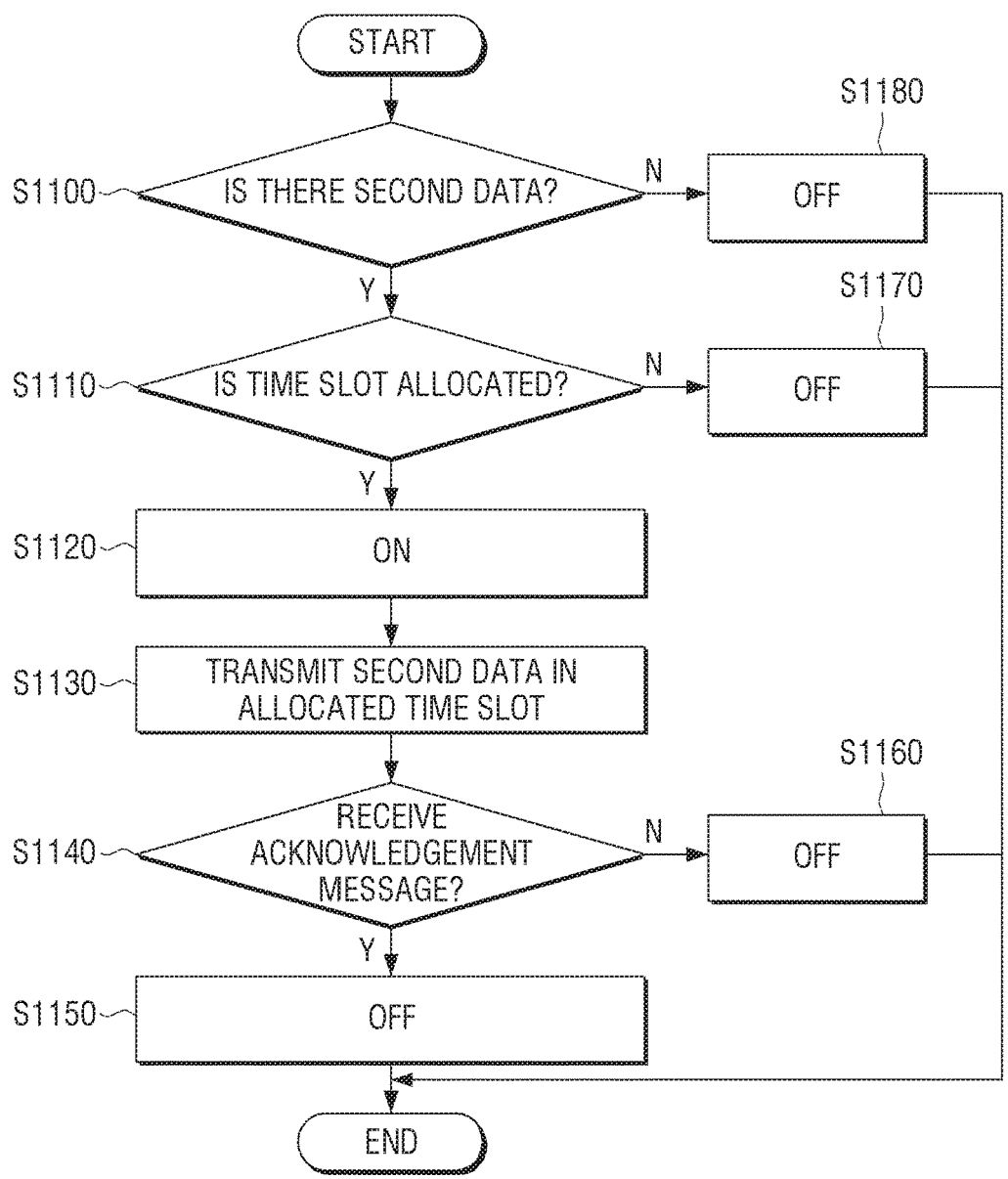
FIG. 11 is a sequence diagram showing a procedure in which a lower node transmits second data to an upper node in a second period according to an embodiment of the present disclosure.

FIG. 11 is a sequence diagram showing a procedure in which a lower node transmits second data to an upper node during a second period according to an embodiment of the present disclosure.

Referring to FIG. 11, according to an embodiment of the present disclosure, the lower node 20 may determine whether there is second data to transmit to the upper node 10 at operation S1100. In response to the presence of second data, the lower node 20 may determine whether there is a corresponding time slot based on a priority of the lower node 20 received from the upper node 10 at operation S1110.

In response to the lower node 20 corresponding to the time slot allocated by the upper node 10, the lower node 20 may turn on during the corresponding time slot at operation S1120. The lower node 20 may transmit the second data to the upper node 10 in the allocated time slot at operation S1130. In response to the lower node 20 receiving an acknowledgement message from the upper node 10 in response to the second data that the lower node 20 transmits to the upper node 10 at operation S1140, the lower node 20 converts its state into the off state at operation S1150 and may finish communication.

If no time slot is allocated by the upper node 10 at operation S1110, the lower node 20 may turn off at operation S1170. In this case, the lower node 20 may repeat determining whether the next time slot is an allocated time slot or not (not shown).

In response to the absence of second data that the lower node 20 will transmit to the upper node 10 at operation S1100, the lower node 20 may turn off at operation S1180. In this case, the lower node 20 may convert its state into the on state in the next time slot period allocated (not shown). In addition, the lower node 20 may communicate by repeating determining whether there is second data to transmit to the upper node 10 in the next time slot (not shown).

In response to the lower node 20 not receiving the acknowledgement message from the upper node 10 in response to the transmitted second data at operation S1140, the lower node 20 may convert turn off state at operation S1160 and thus can reduce power consumption of the lower node 20.

Power which is consumed while the lower node 20 transmits data in the first period 350 in response to the number of lower nodes 20 having priorities being less than or equal to 7 is described below with reference to FIGS. 12A and 12B.

Figure 12A:
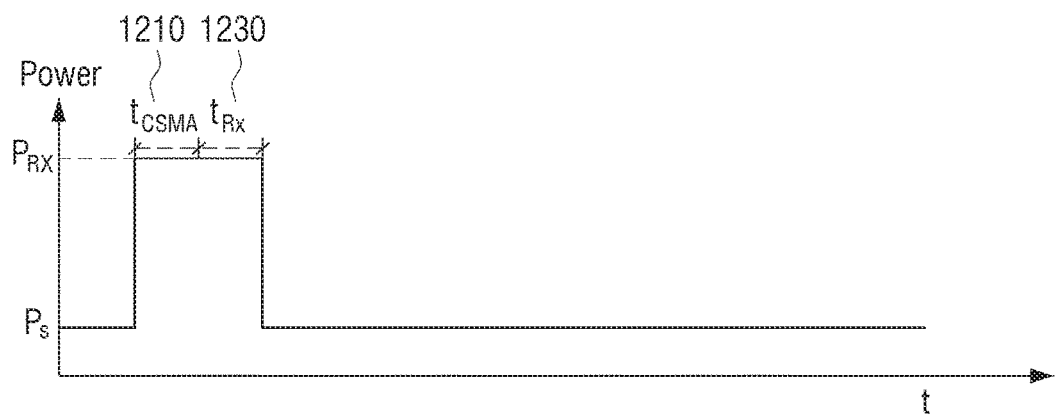
FIGS. 12A and 12B are graphs showing power consumption of a lower node according to transmission/non-transmission of first data in a first period according to various embodiments of the present disclosure.
Figure 12B:
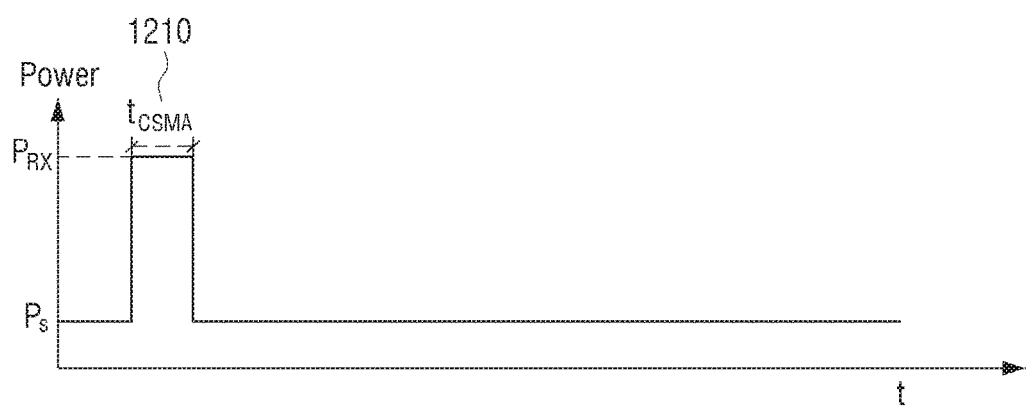

FIGS. 12A and 12B are graphs showing power consumption of a lower node according to transmission/non-transmission of first data in a first period according to various embodiments of the present disclosure.

Referring to FIGS. 12A and 12B, in response to a beacon frame successfully accessing a channel using CSMA/CA, the lower node 20 may receive first data from the upper node 10. In this case, the lower node 20 may transmit an ACK to the upper node 10, and then may convert its state into the off state. Accordingly, the lower node 20 may consume power in a time slot 1210 in which the lower node 20 accesses the channel and a time slot 1230 in which the lower node 20 receives the first data in the first period 350.

Referring to FIG. 12A, the lower node 20 consumes the power during the time slot 1210 in which the beacon frame successfully accesses the channel, and the time slot 1230 in which the lower node 20 receives the first data from the upper node 10 in the first period 350, and converts turns off in the other periods and thus can save power.

FIG. 12B illustrates a graph showing power consumption of the lower node 20 when the beacon frame does not access the channel and the lower node 20 does not receive the first data from the upper node 10 in the first period. The power is consumed during the time slot 1210 until the lower node 20 tries to access the channel, and the lower node 20 converts its state into the off state and thus can save the power.

Figure 13A:
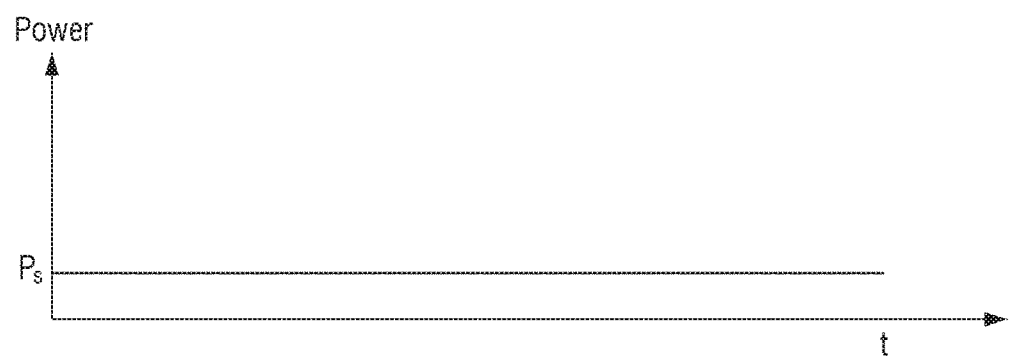
FIGS. 13A and 13B are graphs showing power consumption of a lower node according to reception of second data in the second period in response to the number of lower nodes communicating with the upper node being less than or equal to N number of priorities according to various embodiments of the present disclosure.
Figure 13B:
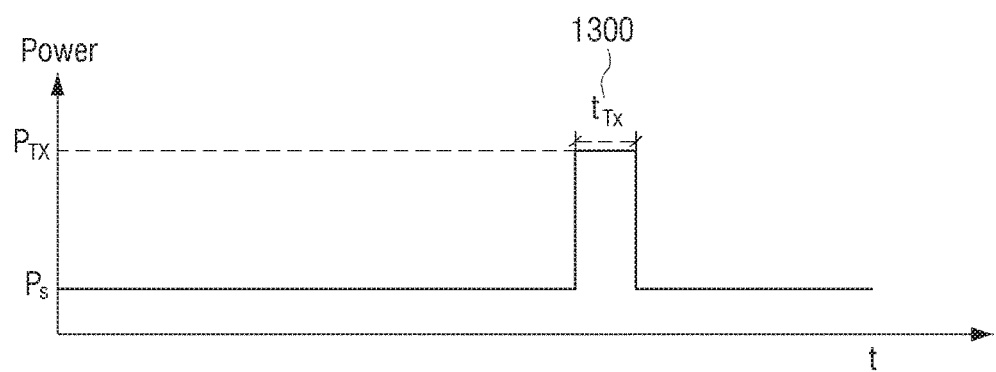

FIGS. 13A and 13B are graphs showing power consumption while one of N number of lower nodes transmits second data in a second period in response to the N number of lower nodes 20 having GTSs according to priorities determined by an upper node 10 being less than or equal to 7 according to various embodiments of the present disclosure.

Referring to FIG. 13A, in response to the lower node 20 not entering the GTS 381, 382, . . . , 38n allocated thereto, the lower node 20 may consume low power which is consumed in the off state of the lower node 20.

Referring to FIG. 13B, in response to the lower node 20 entering the GTS 381, 382, . . . , 38n allocated thereto, the lower node 20 consumes transmission power for transmitting second data to the upper node 10 during the time slot (1300).

The lower node 20 turns off during a time other than the time slot allocated according the priority of the lower node, and thus can save power of the lower node 20. In response to the absence of second data to transmit to the upper node 10 or in response to the lower node 20 not entering the time slot allocated thereto by the upper node 10, the lower node 20 may turn off and thus can save power of the lower node 20.

Accordingly, exemplary embodiments of the present disclosure can provide low power scheduling to the lower node 20 in the second period 370 which is a direct data transmission period of the active period of the wireless network. In addition, a QoS can be provided by allocating the GTS to the lower node 20 based on the priority of the lower node 20 determined by the upper node 10.

FIGS. 14A to 14D are graphs to illustrate power which is consumed while a lower node exchanges first data and second data in response to the number N of lower nodes having priorities in an active period being less than or equal to 7 according to various embodiments of the present disclosure.

Referring to FIGS. 14A to 14D, the amount of power consumed while the lower node 20 exchanges data may vary according to a platform. For example, in the case of the lower node 20 using a CC2420 chip, the amount of power consumed when the lower node 20 receives the first data from the upper node 10 is larger than the amount of power consumed when the lower node 20 transmits the second data to the upper node 10.

Figure 14A:
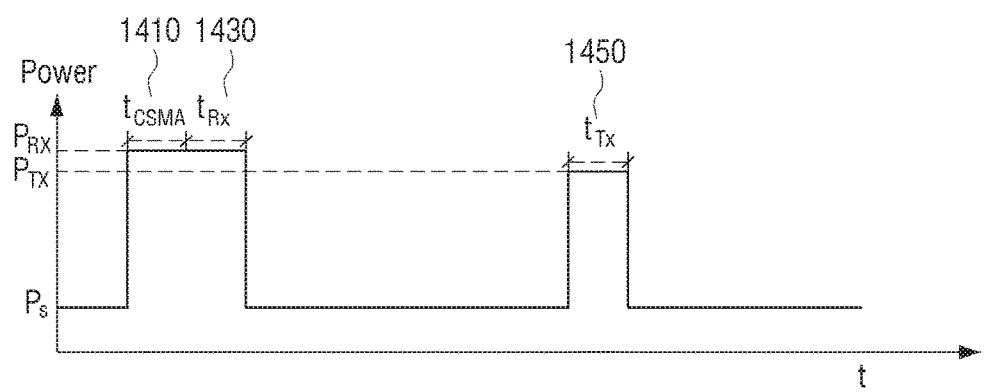
FIGS. 14A to 14D are graphs showing power consumption of a lower node according to presence/absence of first data and second data in an active period in response to the number of lower nodes communicating with an upper node being less than or equal to N number of priorities according to various embodiments of the present disclosure.

Referring to FIG. 14A, in response to the first data being received from the upper node 10 in the first period 350, the lower node consumes power during a time slot 1410 in which a beacon frame accesses a channel, and a time slot 1430 in which the lower node 20 receives the first data from the upper node 10.

In addition, in response to the lower node 20 transmitting the second data to the upper node 10 in the second period 370, the lower node 20 may be in the on state during a time slot 1450 allocated thereto from among the seven GTSs. In this case, the lower node 20 consumes power during the time slot 1450 in which the lower node 20 transmits the second data to the upper node 10.

Figure 14B:
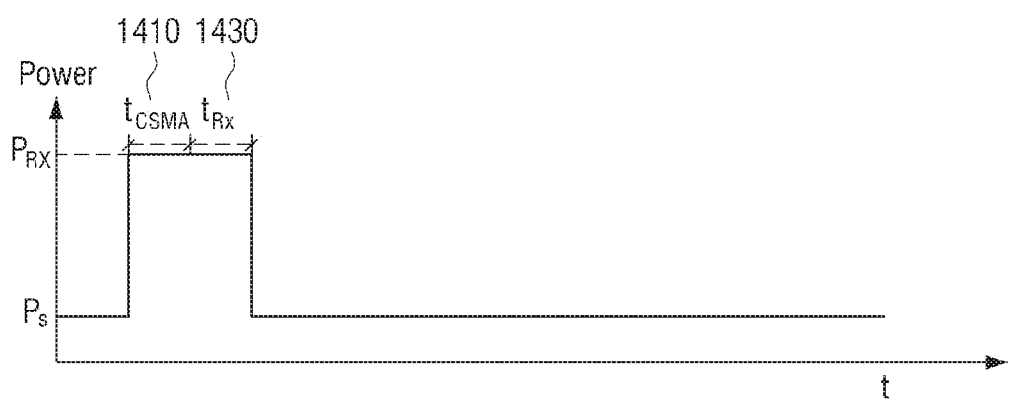

FIG. 14B illustrates a graph showing power consumption of the lower node 20 in response to the absence of second data to transmit to the upper node 10 and the lower node 20 receiving the first data from the upper node 20.

Referring to FIG. 14B, the lower node 20 consumes power during the time slot 1410 in which the beacon frame accesses the channel, and the time slot 1430 in which the lower node 20 receives the first data from the upper node 10 in the first period 350.

Figure 14C:
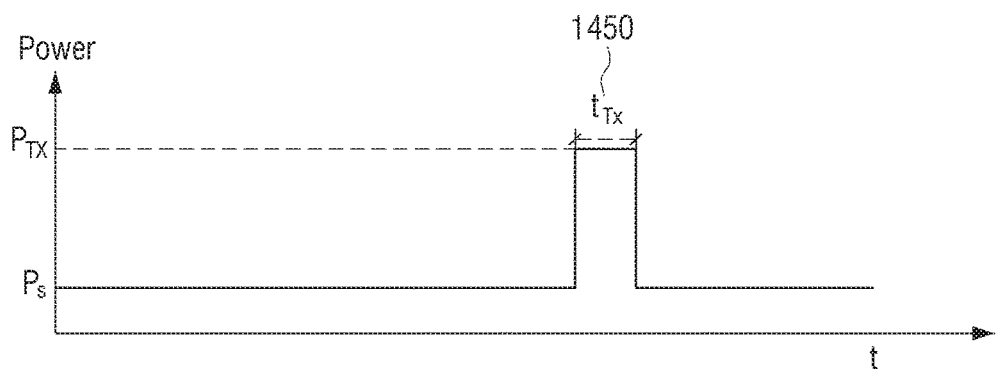

FIG. 14C illustrates a graph showing power which is consumed by the lower node 20 in response to the absence of first data to receive from the upper node 10 and the lower node 20 transmitting the second data to the upper node 10.

Referring to FIG. 14C, in response to the lower node 20 entering the GTS 1450 allocated thereto, the lower node 20 consumes power during the time slot 1450 in which the lower node 20 transmits the second data to the upper node 10.

Figure 14D:
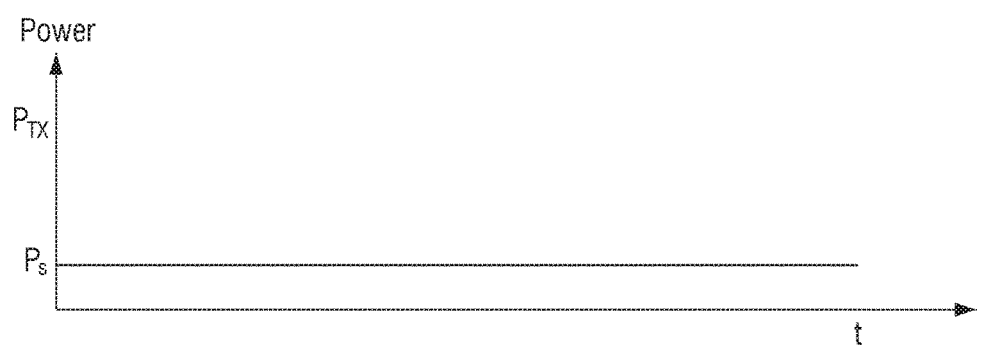

Referring to FIG. 14D, if no first data is received by the lower node 20 from the upper node 10, and no second data is transmitted by the lower node 20 to the upper node 10, the lower node 20 may turn off and consume low power.

Accordingly, exemplary embodiments of the present disclosure may provide low power scheduling to the lower node 20 in the second period 370 which is a direct data transmission period in the active period of the wireless network.

Power consumption of the lower node 20 in the first period 350 in response to the number N of lower nodes having priorities exceeding 7 will be explained with reference to FIGS. 15A to 15D according to various embodiments of the present disclosure. (N−7) number of lower nodes 20 having priorities lower than the seventh priority may transmit the second data in the first period using a CSMA/CA algorithm in the direct data transmission method.

FIGS. 15A to 15D are graphs showing power consumption of a lower node according to presence/absence of first data and second data in a first period in response to the number of lower nodes communicating with an upper node exceeding N number of priorities according to various embodiments of the present disclosure.

Referring to FIGS. 15A to 15D, the amount of power consumed while the lower node 20 exchanges data may vary according to a platform. For example, in the case of the lower node 20 using a CC2420 chip, the amount of power consumed when the lower node 20 receives data from the upper node 10 is larger than the amount of power consumed when the lower node 20 transmits data to the upper node 10.

Figure 15A:
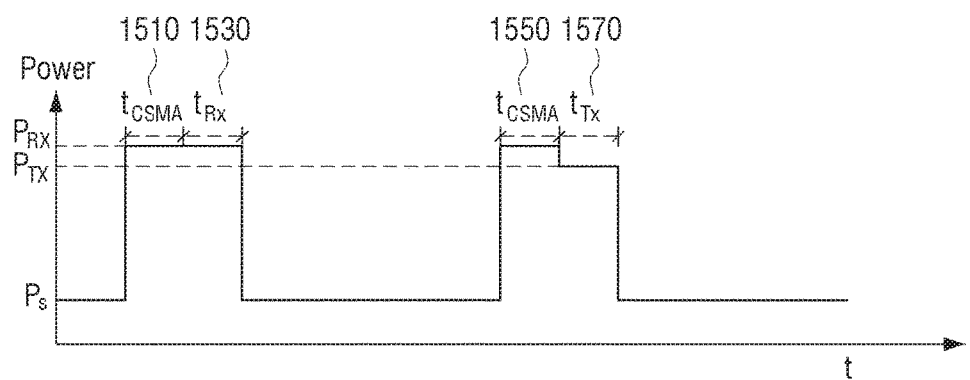
FIGS. 15A to 15D are graphs showing power consumption of a lower node according to presence/absence of first data and second data in a first period in response to a number of lower nodes communicating with an upper node exceeding N number of priorities according to various embodiments of the present disclosure.

FIG. 15A is a graph showing power which is consumed by the lower node 20 in response to the lower node 20 receiving first data from the upper node 10 in the first period and transmitting second data to the upper node 10.

Referring to FIG. 15A, in response to the lower node 20 receiving the first data from the upper node 10, the lower node 20 consumes power in a time slot 1510 in which a beacon frame accesses a channel, and a time slot 1530 in which the lower node 20 receives the first data from the upper node 10.

In addition, the lower node 20 which is not allocated the GTS 381, 382, . . . , 38n from among the lower nodes 20 transmitting the second data may transmit the second data to the upper node 10 using a CDMA/MA algorithm in the first period. In this case, the lower node 20 may consume power in a time slot 1550 in which the beacon frame accesses the channel, and a time slot 1570 in which the lower node 20 transmits the second data to the upper node 10.

Figure 15B:
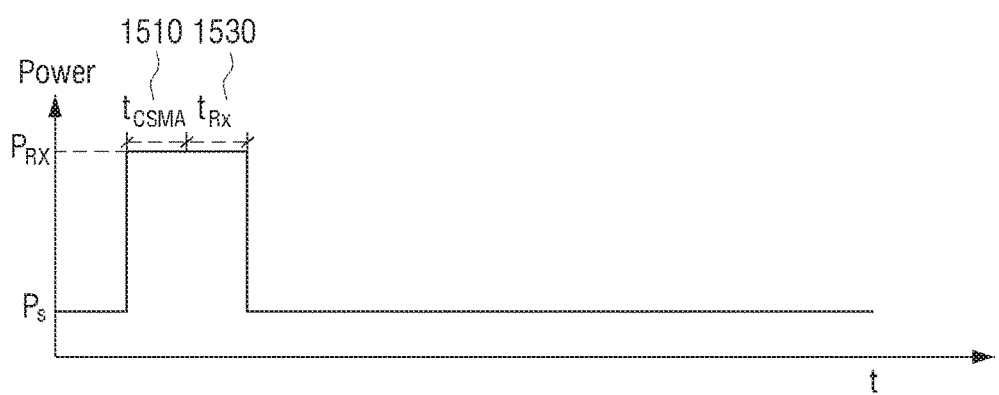

FIG. 15B illustrates a graph showing power consumption of the lower node 20 in response to the absence of first data that the lower node 20 receives from the upper node 10 in the first period 350, and the absence of second data that the lower node 20 transmits to the upper node 10.

Referring to FIG. 15B, the lower node 20 may consume power during the time slot 1510 in which the beacon frame accesses the channel, and the time slot 1530 in which the lower node 20 receives the first data from the upper node 10.

Figure 15C:
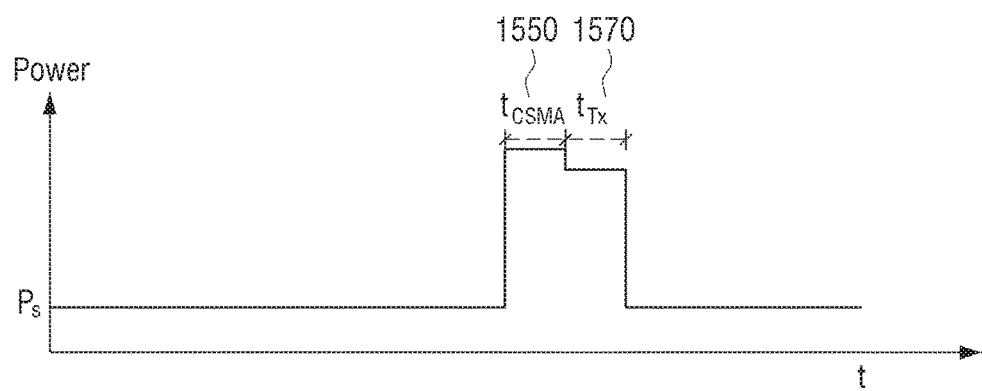

FIG. 15C illustrates a graph showing power consumption of the lower node 20 in response to the absence of first data that is received by the lower node 20 from the upper node 10 and the presence of second data that is transmitted by the lower node 20 to the upper node 10.

Referring to FIG. 15C, the lower node 20 may consume power in the time slot 1550 in which the beacon frame accesses the channel using the CSMA/CA algorithm in the first period 350, and the time slot 1570 in which the lower node 20 transmits the second data to the upper node 10.

Figure 15D:
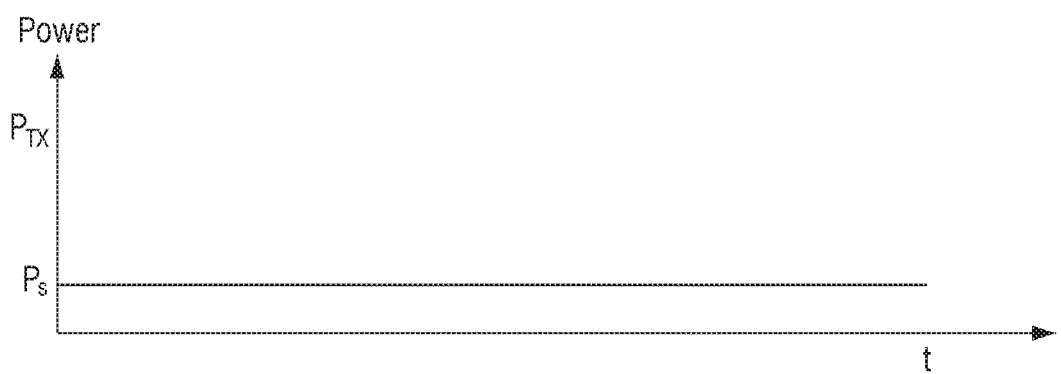

Referring to FIG. 15D, if no data is exchanged by the lower node 20 in the first period 350, the lower node 20 turn off and consume low power.

Accordingly, exemplary embodiments of the present disclosure may provide low power scheduling to the lower node 20 in the first period 350 which is an indirect data transmission period in the active period of the wireless network.

Configurations of an upper node and a lower node according to an embodiment of the present disclosure are described below with reference to FIGS. 16 and 17.

Figure 16:
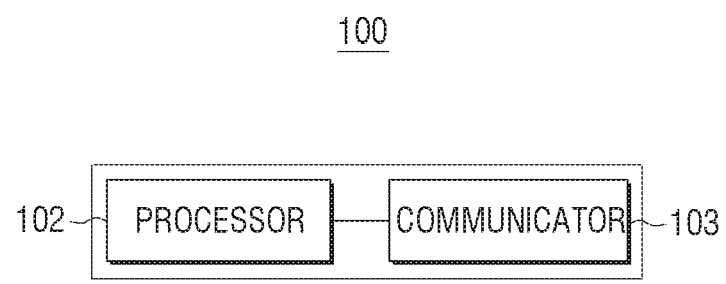
FIG. 16 is a schematic block diagram of a lower node according to an embodiment of the present disclosure.

FIG. 16 is a block diagram schematically illustrating a lower node according to an embodiment of the present disclosure.

Referring to FIG. 16, the lower node 100 may receive a beacon message from an upper node 200 and a communicator 103 may communicate with the upper node 100. In addition, the communicator 103 may exchange data with the upper node 200 in a time slot of the lower node 100 which is determined by the upper node 200.

A processor 102 may control the communicator 103 to receive first data from the upper node 200 in the first period 350 of the active period 320, in which the lower node 10 receives the beacon message from the upper node 200 (310) and communicates with the upper node 200, and control the communicator 103 to transmit second data to the upper node 200 according to the priority of the lower node 100 in the second period 370.

In response to the lower node 200 having N number of time slots 381, 382, . . . , 38*n* in the second period 350, and the number of lower nodes 200 communicating with the upper node 100 being less than or equal to N, the processor 102 may control the communicator 103 to transmit the second data to the upper node 100 in the time slot 381, 382, . . . , 38*n* allocated based on the priority of the lower node 100 which is determined by the upper node 200.

In addition, in the case where the number of lower nodes 200 communicating with the upper node 100 exceeds N, in response to the priority of the lower node 100 being higher than the N-th priority (for example, 1st, 2nd, 3rd, 4th, . . . , N-th), the processor 102 may control the communicator 103 to transmit the second data to the upper node 200 in the time slot corresponding to the lower node 100 in the second period. In this case, in response to the priority of the lower node 100 being lower than the N-th priority (for example, N+1th, N+2th, . . . N+nth), the processor 102 may control the communicator 103 to transmit the second data to the upper node 200 in the first period.

The processor 102 may control the communicator 103 to turn on the lower node 200 in the time slot period 381, 382, . . . , 38*n* corresponding to the lower node 100 in the second period, and to turn off the lower node 100 in the other periods of the second period.

If first data is received by the lower node 100 from the upper node 200 in the first period 350, the processor 102 may control the communicator 103 to turn on the lower node 100 and receive the first data from the upper node 200. After transmitting an ACK to the upper node 200, the processor 102 may control the communicator 103 to turn off the lower node 100, and, in response to the absence of first data, the processor 102 may control the communicator 103 to turn off the lower node 100.

Figure 17:
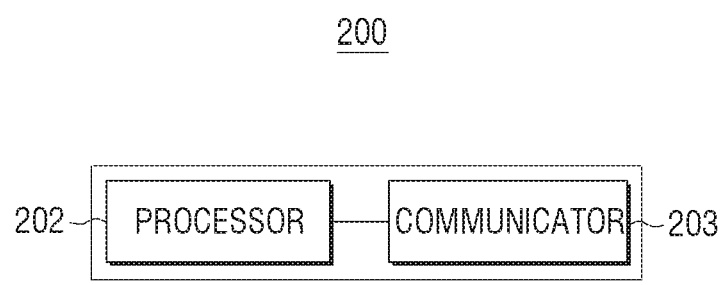
FIG. 17 is a schematic block diagram of an upper node according to an embodiment of the present disclosure.

FIG. 17 is a block diagram schematically illustrating an upper node according to an embodiment of the present disclosure.

Referring to FIG. 17, a communicator 203 may control the upper node 200 to communicate with a plurality of lower nodes 100 using a beacon signal. The communicator 203 may communicate with a specific lower node 100 based on a priority of the lower node 100 determined by the upper node 200.

Referring to FIG. 17, the processor 202 may control the communicator 203 to receive second data from the plurality of lower nodes 100 according to priorities of the plurality of lower nodes 100 in the second period of the active period 320, in which the upper node 200 communicates with the plurality of lower nodes 100 using the beacon signal, and may control the communicator 203 to transmit first data to the plurality of lower nodes 100 in the first period of the active period 320.

In response to the lower nodes 100 having N number of time slots 381, 382, . . . , 38*n* in the second period, and in response to the number of lower nodes 100 communicating with the upper node 200 being less than or equal to N, the processor 202 may control the communicator 203 to receive the second data from the lower nodes 100 in the time slots 381, 382, . . . , 38*n* allocated based on the priorities of the lower nodes 200 which are determined by the upper node 100.

In the case where the lower nodes 100 have N number of time slots 381, 382, . . . , 38*n* in the second period, and the number of lower nodes 100 communicating with the upper node 200 exceeds N, in response to the priority of the lower node 100 being higher than the N-th priority (for example, 1st, 2nd, 3rd, 4th, . . . , N-th), the processor 202 may control the communicator 203 to receive the second data from the lower nodes 100 in the time slots 381, 382, . . . , 38*n* corresponding to the lower nodes 100 in the second period.

In response to the lower node 100 being in the on state in the time slot 381, 382, . . . , 38*n* corresponding to the lower node 200 in the second period, the processor 202 may control the communicator 203 to receive the second data from the lower node 100.

In response to the upper node 200 transmitting the first data to the lower node 100 in the first period and the lower node 100 being in the on state, the processor 202 may control the communicator 203 to receive an ACK from the lower node 100.

Accordingly, according to an embodiment of the present disclosure, the lower node 20 is converted into the on/off state during the time slots 381, 382, . . . , 38*n* allocated according to the priority, and thus consumes power when transmitting data in the time slot corresponding to the lower node 20, so that unnecessary power consumption in the lower node 20 can be prevented.

According to various embodiments of the present disclosure, the active period may be divided into the first period and the second period. The upper node and the lower node may communicate the first data in the first period in the indirect data transmission method, and communicate the second data in the second period in the direct data transmission method. In this case, in the second period, specific time slots can be allocated one to one according to the priorities of the lower nodes which are determined by the upper node. In addition, in response to the absence of data to transmit in the first period and the second period, the lower node is converted into the on state during a corresponding time slot, and maintains the off state during the other periods. Accordingly, the lower node communicating with the upper node during the active period can reduce waste of a battery.

The terms "on" and "off" used in various embodiments of the present disclosure may refer to turning on/off an RF transceiver which is embedded in the lower node 20 or an RF transceiver of a sensor which is attached to the lower node 20. That is, in response to the lower node 20 not corresponding to a time slot allocated thereto, the lower node 20 may turn off the RF transceiver. However, this is merely an example for easy explanation of the present disclosure. In response to the lower node 20 communicating with the upper node 10, another chip controlling communication of the lower node 20 may be controlled to be turned on/off.

The communication method according to various embodiments of the present disclosure may be implemented in a recording medium which is readable by a computer or a similar device using software, hardware, or a combination of these.

The apparatus or method according to various embodiments of the present disclosure may be performed by at least one computer (for example, a processor) which executes instructions included in at least one program from among programs which are maintained in a computer-readable storage medium.

When the instructions are executed by a computer (for example, a processor), the at least one computer may perform a function corresponding to the instructions. In this case, the computer-readable storage medium may be a memory 230, for example.

The program may be included in a computer-readable storage medium such as a hard disk, a floppy disk, magnetic medium (for example, a magnetic tape), optical media (for example, a compact-disc read only memory (CD-ROM), a digital versatile disk (DVD), magneto-optical media (for example, a floptical disk)), a hardware device (for example, a ROM, a random access memory (RANI), or a flash memory), etc. In this case, the storage medium may be included as a part of a configuration of the electronic device 200, but may be mounted through a port of the electronic device 200 or may be included in an external device (for example, a cloud, a server, or another electronic device) located outside the electronic device 200.

In addition, the program may be stored in a plurality of storage media separately. In this case, at least part of the plurality of storage media may be located in an external device of the electronic device 200.

The instructions may include machine language codes created by a compiler, and high-level language codes that can be executed by a computer by using an interpreter. The above-described hardware device may be configured to operate as one or more software modules to perform the operations according to various embodiments of the present disclosure, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An upper node which communicates with a plurality of lower nodes in a wireless network, the upper node comprising:
    a communicator configured to communicate with the plurality of lower nodes; and
    at least one processor configured to:
        determine a priority for each of the plurality of lower nodes, the determining of the priority being based on information describing the each of the plurality of lower nodes,
        control the communicator to transmit a beacon message to the plurality of lower nodes, the beacon message including the priorities of the each of the plurality of lower nodes,
        control the communicator to transmit first data to the plurality of lower nodes in a first period using the beacon message, in an indirect data transmission method, and
        control the communicator to receive second data from the plurality of lower nodes according to the each of the priorities of the plurality of lower nodes in a second period in a direct data transmission method.

2. The upper node of claim 1,
    wherein the second period has N number of time slots, and
    wherein the at least one processor is further configured to, in response to a number of lower nodes communicating with the upper node being less than or equal to N, control the communicator to receive the second data from the lower nodes in time slots allocated based on the determining of the priorities of the lower nodes by the upper node.

3. The upper node of claim 2, wherein the at least one processor is further configured to:
    in response to the number of lower nodes communicating with the upper node exceeding N, and the priorities of the lower nodes being higher than the Nth priority, control the communicator to receive the second data from the lower nodes in the time slots corresponding to the lower nodes in the second period, and
    in response to the priorities of the lower nodes being lower than the Nth priority, control the communicator to receive the second data from the lower nodes in the first period in the direct data transmission method.

4. The upper node of claim 2, wherein the at least one processor is further configured to, in response to the lower nodes being in an on state in the time slots corresponding to the lower nodes, control the communicator to receive the second data from the lower nodes.

5. The upper node of claim 1, wherein the at least one processor is further configured to, in response to the upper node transmitting the first data to the lower nodes in the first period, and the lower nodes being in an on state, control the communicator to receive an acknowledgement message from the lower nodes.

6. The upper node of claim 1,
wherein the first period is a contention access period (CAP), and
wherein the second period is a contention free period (CFP).

7. A lower node configured to communicate with an upper node in a wireless network, the lower node comprising:
a communicator configured to:
receive a beacon message from the upper node, the beacon message including the priorities of each of the plurality of lower nodes, the priorities for the each of the plurality of lower nodes being determined by the upper node based on information describing the each of the plurality of lower nodes, and
communicate with the upper node; and
at least one processor configured to:
control the communicator to receive first data from the upper node in a first period in which the lower node receives the beacon message in an indirect data transmission method, and
control the communicator to transmit second data to the upper node according to a priority of the lower node in a second period in a direct data transmission method.

8. The lower node of claim 7,
wherein the second period has N number of time slots, and
wherein the at least one processor is further configured to, in response to a number of lower nodes communicating with the upper node being less than or equal to N, control the communicator to transmit the second data to the upper node in a time slot allocated based on the determined priority of the lower node by the upper node.

9. The lower node of claim 8, wherein the at least one processor is further configured to:
in response to a number of lower nodes communicating with the upper node exceeding N, and the priority of the lower node being higher than the N-th priority, control the communicator to transmit the second data to the upper node in the time slot corresponding to the lower node in the second period, and
in response to the priority of the lower node being lower than the N-th priority, control the communicator to transmit the second data to the upper node in the first period in the direct data transmission method.

10. The lower node of claim 8, wherein the at least one processor is further configured to:
control the communicator to turn on in the time slot corresponding to the lower node in the second period, and
control the communicator to turn off in the other periods of the second period.

11. The lower node of claim 7, wherein the at least one processor is further configured to:
in response to a presence of first data that the lower node receives from the upper node in the first period, control the communicator to turn on, receive the first data from the upper node, transmit an acknowledgement message to the upper node, and then turn off, and
in response to an absence of first data, control the communicator to turn off.

12. The lower node of claim 7,
wherein the first period is a contention access period (CAP), and
wherein the second period is a contention free period (CFP).

13. A non-transitory computer readable recording medium comprising a program for executing a communication method in which an upper node and a plurality of lower nodes communicate in a wireless network, the communication method comprising:
determining, by the upper node, priorities of the plurality of lower nodes;
transmitting a beacon message the beacon message including the priorities of the plurality of lower nodes;
determining, by the plurality of lower nodes, priorities based on the beacon message received from the upper node;
transmitting, by the upper node, first data to the plurality of lower nodes in a first period in an indirect data transmission method; and
transmitting, by the plurality of lower nodes, second data to the upper node based on the determined priorities in a second period, in which the lower nodes communicate with the upper node, in a direct data transmission method.

14. The non-transitory computer readable recording medium of claim 13,
wherein the second period has N number of time slots, and
wherein the transmitting the second data comprises, in response to a number of the plurality of lower nodes communicating with the upper node being less than or equal to N, transmitting the second data to the upper node in time slots allocated based on the priorities of the lower nodes which are determined by the upper node.

15. The non-transitory computer readable recording medium of claim 14, wherein the transmitting the second data comprises:
in response to a number of the plurality of lower nodes exceeding N, and the priorities of the plurality of lower nodes being higher than the N-th priority, transmitting the second data to the upper node in the time slots corresponding to the lower nodes in the second period, and
in response to the priorities of the lower nodes being lower than the N-th priority, transmitting the second data to the upper node in the first period in the direct data transmission method.

16. The non-transitory computer readable recording medium of claim 13, wherein the transmitting the first data in the first period comprises transmitting, by the upper node, the first data to the plurality of lower nodes.

17. The non-transitory computer readable recording medium of claim 13, wherein the communication method further comprises:
turning on the lower nodes in time slots corresponding to the lower nodes in the second period; and
turning off the lower nodes in the other periods of the second period.

18. The non-transitory computer readable recording medium of claim 13, wherein the communication method further comprises:
in response to the presence of first data that at least one of the plurality of lower nodes receives from the upper node in the first period:
turning on the lower node,
receiving the first data from the upper node, transmitting an acknowledgement message to the upper node, and turning off the lower node; and in response to the absence of the first data, turning off the lower node.

19. The non-transitory computer readable recording medium of claim 13, wherein the first period is a contention access period (CAP), and wherein the second period is a contention free period (CFP).

* * * * *